United States Patent
Mascaro et al.

(10) Patent No.: US 11,030,631 B1
(45) Date of Patent: Jun. 8, 2021

(54) METHOD AND SYSTEM FOR GENERATING USER EXPERIENCE ANALYTICS MODELS BY UNBIASING DATA SAMPLES TO IMPROVE PERSONALIZATION OF USER EXPERIENCES IN A TAX RETURN PREPARATION SYSTEM

(71) Applicant: Intuit Inc., Mountain View, CA (US)

(72) Inventors: Massimo Mascaro, San Diego, CA (US); Joseph Cessna, San Diego, CA (US); Peter Ouyang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 636 days.

(21) Appl. No.: 15/010,689

(22) Filed: Jan. 29, 2016

(51) Int. Cl.
*G06Q 30/02* (2012.01)
*G06Q 40/00* (2012.01)

(52) U.S. Cl.
CPC ..... *G06Q 30/0201* (2013.01); *G06Q 30/0203* (2013.01); *G06Q 40/123* (2013.12)

(58) Field of Classification Search
CPC .............. G06Q 30/0204; G06Q 30/0201
See application file for complete search history.

(56) References Cited

U.S. PATENT DOCUMENTS

| | | | |
|---|---|---|---|
| 4,763,277 A | 8/1988 | Ashford et al. | |
| 6,327,574 B1 * | 12/2001 | Kramer | G06Q 30/0269 705/14.66 |
| 6,922,488 B2 | 7/2005 | Mastrianni et al. | |
| 6,973,418 B1 | 12/2005 | Kirshenbaum | |
| 7,716,094 B1 | 5/2010 | Sutter et al. | |
| 7,769,647 B1 | 8/2010 | Char et al. | |
| 7,788,137 B1 | 8/2010 | Tifford | |
| 7,788,204 B1 | 8/2010 | Thomas | |
| 7,797,166 B1 | 9/2010 | Bradley et al. | |

(Continued)

FOREIGN PATENT DOCUMENTS

| | | |
|---|---|---|
| WO | 2006058207 A2 | 6/2006 |
| WO | WO 2016/039779 | 3/2016 |

OTHER PUBLICATIONS

Hoeting et al., "Bayesian Model Averaging," Technical Report 335, Department of Statistics, University of Washington, May 28, 1998, 40 pages.

(Continued)

*Primary Examiner* — Andre D Boyce
(74) *Attorney, Agent, or Firm* — Paradice and Li LLP

(57) ABSTRACT

A method and system adaptively improves potential customer conversion rates, revenue metrics, and/or other target metrics by providing effective user experience options to some users while concurrently testing user responses to other user experience options, among a variety of user experience options, according to one embodiment. The method and system selects the user experience options by applying user characteristics data to an analytics model, according to one embodiment. The method and system analyzes user responses to the user experience options to update the analytics model, and to dynamically adapt the personalization of the user experience options, at least partially based on feedback from users, according to one embodiment. The method and system determines bias weights from characteristics of the analytics model and uses the bias weights to compensate for data biases when updating or generating analytics models.

6 Claims, 15 Drawing Sheets

(56) References Cited

U.S. PATENT DOCUMENTS

| | | |
|---|---|---|
| 7,860,763 B1 | 12/2010 | Quinn et al. |
| 7,917,411 B1 | 3/2011 | Bedell |
| 8,024,660 B1 | 9/2011 | Quinn et al. |
| 8,090,794 B1 | 1/2012 | Kilat et al. |
| 8,099,309 B1 | 1/2012 | Bober |
| 8,190,499 B1 | 5/2012 | McVickar |
| 8,200,527 B1* | 6/2012 | Thompson ......... G06Q 10/0639 |
| | | 705/7.39 |
| 8,346,635 B1 | 1/2013 | Olim |
| 8,407,113 B1 | 3/2013 | Eftekhari et al. |
| 8,452,676 B1 | 5/2013 | Talan et al. |
| 8,490,018 B2 | 7/2013 | Carter et al. |
| 8,706,762 B1 | 4/2014 | Patzer et al. |
| 8,768,313 B2 | 7/2014 | Rodriguez |
| 8,775,070 B1 | 7/2014 | Bhatia |
| 8,806,444 B1 | 8/2014 | Podgorny et al. |
| 8,909,568 B1 | 12/2014 | Mann et al. |
| 9,128,911 B1 | 9/2015 | Howe et al. |
| 9,355,650 B2 | 5/2016 | Dimitriadis et al. |
| 9,378,065 B2 | 6/2016 | Shear et al. |
| 9,442,827 B2 | 9/2016 | Mascaro et al. |
| 9,444,824 B1 | 9/2016 | Balazs et al. |
| 9,484,044 B1 | 11/2016 | Mascaro et al. |
| 9,530,434 B1 | 12/2016 | Mascaro et al. |
| 9,648,171 B1 | 5/2017 | Eftekhari et al. |
| 9,870,785 B2 | 1/2018 | Bradley et al. |
| 9,891,792 B1 | 2/2018 | Morin et al. |
| 9,922,668 B2 | 3/2018 | Bradley et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 10,096,072 B1 | 10/2018 | Ali et al. |
| 10,162,734 B1 | 12/2018 | Podgorny et al. |
| 10,169,828 B1 | 1/2019 | Morin et al. |
| 10,176,534 B1 | 1/2019 | Mascaro et al. |
| 10,204,382 B2 | 2/2019 | Morin et al. |
| 2002/0152457 A1 | 10/2002 | Jahnke |
| 2003/0028451 A1* | 2/2003 | Ananian ................ G06Q 30/02 |
| | | 705/26.42 |
| 2003/0144868 A1 | 7/2003 | MacIntyre et al. |
| 2006/0112114 A1 | 5/2006 | Yu et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2007/0100679 A1* | 5/2007 | Wollan ................ G06Q 10/063 |
| | | 705/7.29 |
| 2007/0192166 A1 | 8/2007 | Van Luchene |
| 2007/0239518 A1 | 10/2007 | Chung et al. |
| 2007/0260596 A1 | 11/2007 | Koran et al. |
| 2008/0071703 A1 | 3/2008 | Evans |
| 2008/0077462 A1* | 3/2008 | Patel ................... G06Q 20/108 |
| | | 705/7.33 |
| 2008/0127127 A1 | 5/2008 | Chitgupakar et al. |
| 2008/0147494 A1 | 6/2008 | Larson |
| 2009/0089141 A1 | 4/2009 | Lara et al. |
| 2009/0106178 A1 | 4/2009 | Chu |
| 2009/0132368 A1 | 5/2009 | Cotter et al. |
| 2009/0313086 A1 | 12/2009 | Lee et al. |
| 2011/0071975 A1 | 3/2011 | Friedlander et al. |
| 2011/0243553 A1 | 10/2011 | Russell |
| 2011/0264569 A1 | 10/2011 | Houseworth et al. |
| 2011/0288868 A1 | 11/2011 | Lloyd et al. |
| 2011/0296401 A1 | 12/2011 | DePoy |
| 2012/0027246 A1 | 2/2012 | Tifford et al. |
| 2012/0030079 A1 | 2/2012 | Slater et al. |
| 2012/0030080 A1 | 2/2012 | Slater et al. |
| 2012/0109792 A1 | 5/2012 | Eftekhari et al. |
| 2012/0150888 A1* | 6/2012 | Hyatt ................... G06F 16/335 |
| | | 707/758 |
| 2012/0215669 A1 | 8/2012 | Lieberman et al. |
| 2012/0303559 A1 | 11/2012 | Dolan |
| 2013/0080911 A1* | 3/2013 | Klemm ................ G06F 16/958 |
| | | 715/745 |
| 2013/0088650 A1* | 4/2013 | Rouady ............. H04N 21/4432 |
| | | 348/734 |
| 2013/0198047 A1 | 8/2013 | Houseworth et al. |
| 2013/0268468 A1 | 10/2013 | Vijayaraghavan et al. |
| 2013/0282539 A1 | 10/2013 | Murray |
| 2014/0067518 A1 | 3/2014 | McGovern |
| 2014/0068407 A1 | 3/2014 | Suh et al. |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0156681 A1* | 6/2014 | Lee ..................... G06F 16/9535 |
| | | 707/754 |
| 2014/0201045 A1 | 7/2014 | Pai et al. |
| 2014/0359261 A1 | 12/2014 | Collins et al. |
| 2015/0039297 A1 | 2/2015 | Greer et al. |
| 2015/0112826 A1* | 4/2015 | Crutchfield, Jr. .. G06Q 30/0601 |
| | | 705/26.1 |
| 2015/0205842 A1* | 7/2015 | Jain ........................ G06Q 10/10 |
| | | 707/732 |
| 2015/0220604 A1* | 8/2015 | Bunnell ................ G06F 16/436 |
| | | 707/776 |
| 2015/0227962 A1 | 8/2015 | Wical et al. |
| 2015/0254675 A1* | 9/2015 | Kannan ................ G06Q 30/016 |
| | | 705/304 |
| 2016/0012350 A1 | 1/2016 | Narayanan et al. |
| 2016/0029055 A1* | 1/2016 | Villegas Nunez ...... H04L 65/60 |
| | | 725/14 |
| 2016/0063645 A1 | 3/2016 | Houseworth et al. |
| 2016/0078471 A1* | 3/2016 | Hamedi ............ G06F 16/24578 |
| | | 705/14.41 |
| 2016/0078567 A1 | 3/2016 | Goldman et al. |
| 2016/0098804 A1 | 4/2016 | Mascaro et al. |
| 2016/0103667 A1 | 4/2016 | Chen et al. |
| 2016/0148321 A1 | 5/2016 | Ciaramitaro et al. |
| 2016/0180470 A1 | 6/2016 | Mascaro et al. |
| 2016/0180484 A1 | 6/2016 | Roebuck |
| 2016/0217534 A1 | 7/2016 | Goldman et al. |
| 2016/0247239 A1 | 8/2016 | Houseworth et al. |
| 2016/0267397 A1 | 9/2016 | Carlsson |
| 2016/0335674 A1* | 11/2016 | Plourde ............. G06Q 30/0251 |
| 2016/0342911 A1* | 11/2016 | Kannan ............. G06Q 10/0631 |
| 2016/0350870 A1 | 12/2016 | Morin et al. |
| 2017/0004422 A1* | 1/2017 | Todd ................... G06Q 10/0633 |
| 2017/0090893 A1 | 3/2017 | Aditya et al. |
| 2017/0103439 A1 | 4/2017 | Kolb et al. |
| 2017/0178199 A1 | 6/2017 | Cessna et al. |
| 2017/0186097 A1 | 6/2017 | Mascaro et al. |
| 2017/0193546 A1 | 7/2017 | Bennett et al. |
| 2017/0195488 A1* | 7/2017 | Pendyala ............. H04M 3/5183 |
| 2017/0200087 A1 | 7/2017 | Mascaro et al. |
| 2017/0220943 A1 | 8/2017 | Duncan et al. |
| 2017/0236131 A1* | 8/2017 | Nathenson ......... G06Q 30/0201 |
| | | 705/26.7 |
| 2017/0270526 A1 | 9/2017 | Fitzgerald |
| 2017/0300933 A1 | 10/2017 | Mascaro et al. |
| 2017/0308960 A1 | 10/2017 | Mascaro et al. |
| 2017/0315791 A1 | 11/2017 | Mascaro et al. |

OTHER PUBLICATIONS

Rokach et al., "Top-Down Induction of Decision Trees Classifiers—A Survey," IEEE Transactions on Systems, Man, and Cybernetics—Part C: Applications and Reviews, vol. 35, No. 4, Nov. 2005, pp. 476-487.

Araujo et al., "Ensemble Forecasting of Species Distributions," ScienceDirect Trends in Ecology and Evolution, vol. 22, No. 1, Sep. 29, 2006, pp. 42-47.

Agrawal et al., "Thompson Sampling for Contextual Bandits with Linear Payoffs," Proceedings of the $30^{th}$ International Conference on Machine Learning, Atlanta, Georgia, USA, JMLR: W&CP vol. 28, 2013, 9 pages.

Irsoy et al., "Budding Trees," $22^{nd}$ International Conference on Pattern Recognition, 2014, pp. 3582-3587.

Bell et al., "The use of multi-criteria decision-making methods in the integrated assessment of climate change: implications for IA practitioners," Socio-Economic Planning Sciences vol. 37, Issue 4, Dec. 2003, pp. 289-316, Elsevier Science Ltd.

(56) References Cited

OTHER PUBLICATIONS

Lee et al., "The Internet of Things (IoT): Applications, investments, and challenges for enterprises," Business Horizons vol. 58, Issue 4, Jul.-Aug. 2015, pp. 431-440, Elsevier Inc.

Poyarkov et al., "Boosted Decision Tree Regression Adjustment for Variance Reduction in Online Controlled Experiments," KDD '16 Proceedings of the $22^{nd}$ ACM SIGKDD International Conference on Knowledge Discovery Data Mining, pp. 235-244, ACM Digital Library.

Said, Jeremy, "Why Segmentation is the Key to Any AB Testing Strategy," first published on Jul. 22, 2014. Source: Wayback Machine at https://www.jeremysaid.com/blog/segmentation-secret-ab-testing-strategy, 8-pages.

Zhang et al., "Enabling Personalization Recommendation with WeightedFP for Text Information Retrieval Based on User-Focus," Proceedings of the International Conference on Information Technology: Coding and Computing (ITCC'04), 5 pages, 2004.

Armbrust et al., "Scaling Spark in the Real World," Proceedings of the VLDB Endowment; [ACM Digital Library], Association of Computing Machinery, New York, NY, vol. 8, No. 12, pp. 1840-1843, Aug. 1, 2015.

Breuker, "Towards Model-Driven Engineering for Big Data Analytics—An Exploratory Analysis of Domain-Specific Languages for Machine Learning," 2014 47th Hawaii International Conference on System Sciences, IEEE, pp. 758-767, Jan. 6, 2014.

Chan et al., "PredictionIO: A Distributed Machine Learning Server for Practical Software Development," Proceedings of the 22nd ACM International Conference on Information & Knowledge Management, CIKM '13, pp. 2493-2496, Nov. 2013.

Zaharia et al., "Resilient Distributed Datasets: A Fault-Tolerant Abstraction for In-Memory Cluster Computing," USENIX, USENIX, The Advanced Computer Systems Association, pp. 1-14, Apr. 11, 2013.

\* cited by examiner

USER EXPERIENCE OPTION A

200 intuit TurboTax ⊙   Get Started   Products&Pricing   Help   Tools&Tips   After You File   [Sign In]   201

Tell us about you — we'll recommend the right product

| Single | Have children/ dependents | Own a home | Maximize deductions and credits | Sold stock or bonds/ Own rental property | Own a business/ Sole proprietor |

View CD/Download products▸

| | Federal Free Edition | Deluxe | Premier | Home & Business |
|---|---|---|---|---|
| Compare our product features | Simple tax returns (1040EZ/1040A) | Maximize your tax deductions | Investments and rental property | Small business owner or sole proprietor |
| | [Start for free] Free federal State additional | [Start for free] $54.99* State additional [Most popular*] | [Start for free] $79.99* State additional | [Start for free] $104.99* State additional |
| Easy prep. print and efile | • | • | • | • |
| Automatically imports your W2 tax forms | • | • | • | • |
| Transfers last year's TurboTax return | | • | • | • |
| Searches 350+ tax deductions and credits (1040 Scedule A) | | • | • | • |

USER EXPERIENCE OPTION B

210 intuit TurboTax ⊙   Get Started   Products&Pricing   Help   Tools&Tips   After You File   [Sign In]   211

No matter your tax situation, we have you covered

| | Federal Free Edition | Deluxe | Premier | Home & Business |
|---|---|---|---|---|
| Compare our product features | Simple tax returns (1040EZ/1040A) | Maximize your tax deductions | Investments and rental property | Small business owner or sole proprietor |
| | [Start for free] Free federal State additional | [Start for free] $54.99* State additional [Most popular*] | [Start for free] $79.99* State additional | [Start for free] $104.99* State additional |
| Easy prep. print and efile | • | • | • | • |
| Automatically imports your W2 tax forms | • | • | • | • |
| Transfers last year's TurboTax return | | • | • | • |
| Searches 350+ tax deductions and credits (1040 Scedule A) | | • | • | • |
| Maximizes mortgage/property tax deductions (Schedule A) | | • | • | • |
| Includes itsDeductable™ for charitable donations | | • | • | • |
| Covers miscelaneuos income and some related expenses (1099-MISC) | | • | • | • |

FIG. 2

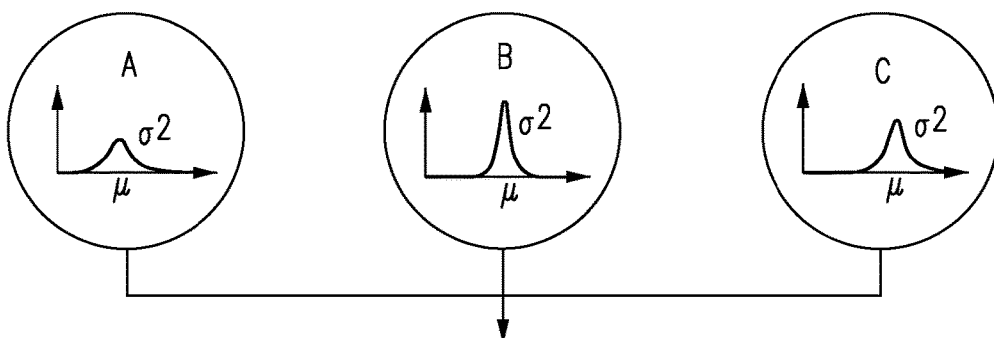

Compute the effective performance of the input estimates blended via Thompson Sampling.

Based on these estimates, compute the probability that the true performance of each experience is better than the other alternatives ($f_i$ is the pdf and $F_i$ is the cdf for the $i^{th}$ experience estimate).

$$p_i^L = p(\bigcap_{j \neq i} \mu_i > \mu_j) = \int f_i(x) \prod_{j \neq i} F_j(x)\, dx$$

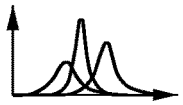

e.g.
P(A > B & A > C) = 0.1
P(B > A & B > C) = 0.3
P(C > A & C > B) = 0.6

$\mu$ = sample mean      $\sigma^2$ = sample variance / number of samples

For the segment, define the allocation probability (the probability of assigning a particular experience to a user in this segment) to be equal to the previously computed probability of that experience being the best. That is, if the probability that C is the best experience is 0.6, then we will allocate 60% of the traffic in this segment to experience C. Given this allocation strategy, compute the effective performance of the entire segment as a weighted combination of each experience.

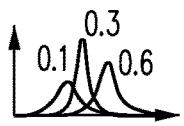  $\mu_{effective} = 0.1\mu_A + 0.3\mu_B + 0.6\mu_C$  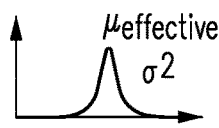

Assignment Prob
P(A) = 0.1
P(B) = 0.3
P(C) = 0.6

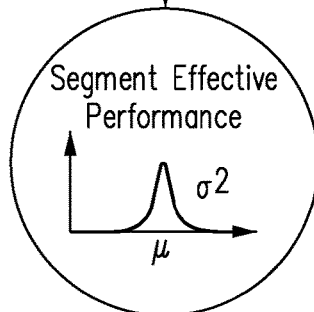

FIG. 11

METHOD AND SYSTEM FOR GENERATING USER EXPERIENCE ANALYTICS MODELS BY UNBIASING DATA SAMPLES TO IMPROVE PERSONALIZATION OF USER EXPERIENCES IN A TAX RETURN PREPARATION SYSTEM

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. That is, there is little or no opportunity for any analytics associated with the interview process, and/or user experience, to evolve to meet a changing situation or the particular needs of a given taxpayer, even as more information about the particular taxpayer and their particular circumstances is obtained.

As an example, using traditional tax return preparation systems, the sequence of questions, and the other user experience elements, presented to a user are pre-determined based on a generic user model that is, in fact and by design, not accurately representative of any "real-world" user. Consequently, irrelevant, and often confusing, interview questions are virtually always presented to any given real-world user. Furthermore, user preferences for user experience content, questions, and/or sequences of questions can change with time because user preferences are regularly swayed and/or altered based on information received from traditional media (e.g., magazines), social media (e.g., Facebook), world events, and the like. It is therefore not surprising that many users, if not all users, of these traditional tax return preparation systems receive, at best, an impersonal, unnecessarily long, confusing, and/or complicated interview process and user experience. Clearly, this is not the type of impression that results in happy and loyal repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. As a result, the potential customers do not become proponents for the tax return preparation systems (e.g., by promoting the product to their friends and family), and may instead become opponents to the tax return preparation systems (e.g., by recommending against the use of the systems). Clearly, this is an undesirable result for both the potential user of the tax return preparation system and the provider of the tax return preparation system.

Some of the shortcomings associated with traditional software systems, e.g., tax return preparation systems, are a result of insufficient, inadequate, and/or antiquated testing techniques. However, even if service providers want to adjust or customize the user experience flow, it can be very difficult to quickly and efficiently ascertain user preferences for content and determine the effect of various types of content on users. Furthermore, merely taking steps to resolve an overly long, impersonal, confusing, and/or complicated user experience flow can create additional implementation problems to overcome. In short, personalizing tax return preparation system and/or other software systems is a very difficult task.

What is needed is a method and system for unbiasing data samples that are used for determining users' preferences for user experience options, to provide personalized user experiences to software system users, according to various embodiments.

SUMMARY

Embodiments of the present disclosure address some of the shortcomings associated with traditional tax return preparation systems and other software systems by identifying users' preferences for user experience options, by integrating the preferred user experience options into personalized user experiences, and by providing the personalized user experiences to users a software system, from the software system. A software system (e.g., a tax return preparation system) applies a user experience analytics model to data representing current users to identify the current users' preferences for user experience options, according to one embodiment. The user experience analytics model divides the current users into segments of current users, based on user characteristics of the current users, according to one embodiment. For each segment of current users, the model dynamically, adaptively, and concurrently provides preferred user experience options to some of the segment of current users and provides test user experience options to others of the segment of current users, according to one embodiment. By providing both preferred and test user experience options to the segments of current users, the user experience analytics model further validates expected levels of effectiveness of the preferred user experience options while concurrently testing/exploring the effectiveness of the test user experience options, according to one embodiment. Based on current users' responses to the preferred and test user experience options, the software system dynamically and adaptively sends preferred user experience options to a higher percentage of future users and sends the less-preferred/test user experience options to a lower percentage of future users, according to one embodiment. As a result, a higher percentage of current users of the software system receive one or more user experience options that are aligned with the current users' preferences for user experience options, according to one embodiment. The more the software system provides users with preferred user experience options, the more likely the users are to perform one or more actions towards becoming paying customers, repeat customers, and/or satisfied customers, according to one embodiment.

Sampling bias is a bias in which a sample is collected such that some members of a population are less likely to be included or are less likely to receive a user experience option than others. Sampling bias results in data sets where users are not allocated to experiences with equal probability. Biased samples, if not corrected, will cause a user experience analytics model to erroneously identify user preferences because the performance determination for user experience options for particular segments of users is based on the assumption that users have a relatively equal likelihood of receiving the user experience options. Biased data samples can cause erroneous estimations of performance of a user experience analytics model, which could result in implementation of an updated or new user experience analytics model, in spite of poorer performance than an existing version of a user experience analytics model. The software system dynamically and adaptively improves the ability of user experience analytics models to identify and provide preferred user experience options, by unbiasing data samples (or metrics associated with the data samples) to generate updated versions of user experience analytics models, by using the data samples of prior users who received user experience options through one or more existing/prior versions of user experience analytics models, according to one embodiment.

Data samples of prior users, who received user experience options through one or more user experience options allocation/distribution schemes, are biased. For example, data samples of prior users are biased when, for example, prior users received user experience options with an arbitrary user experience allocation (e.g., a predetermined percentage or number of users receive one user experience option or another), without consideration for particular attributes or characteristics of the users. As another example, data samples of prior users are biased when, for example, one or more existing/prior versions of user experience analytics models were used to distribute user experience options to the prior users. As yet another example, data samples of prior users are biased when, for example, the data samples are a combination of: prior users who received user experience options based on a user experience analytics model; prior users who received user experience options based on an arbitrary allocation of user experience options; and/or prior users who did not receive a particular user experience option of interest. The data samples of prior users are biased because the user experience analytics model and/or the arbitrary distribution scheme disproportionately delivers user experience options to the prior users, e.g., based on differences in the user characteristics of the prior users. Thus, if two segments of prior users received different user experience options based on a particular allocation/distribution scheme, one segment of the prior users is less likely to have received the same user experience options as the other segment of prior users, by definition of the particular allocation/distribution scheme used to allocate/distribute user experience options to the prior users of the software system, according to one embodiment.

Because the software system uses data samples from prior users to define and/or generate new versions of user experience analytics models, the software system unbiases the data samples from the prior users, to reduce the likelihood of erroneous implementation or operation of the new versions of user experience analytics models, according to one embodiment. In one embodiment, the software system uses biased data samples from prior users to define a new user experience analytics model, the software system determines a bias weight for the existing user experience analytics model, the software system unbiases one or more metrics (e.g., business metrics) within the data samples, the software system determines an estimated or expected performance of the new user experience analytics model, and the software system deploys the new user experience analytics model if the estimated or expected performance of the new user experience analytics model is above a performance threshold, according to one embodiment. In one embodiment, the software system unbiased the data samples of the prior users before defining or generating the new user experience analytics model. These and other embodiments of unbiasing data samples to improve identifying current users' preferences for user experience options are disclosed in more detail in the DETAILED DESCRIPTION section.

A user experience analytics model includes algorithmic logic that is used to determine current users' preferences for user experience options, according to one embodiment. The software system uses the user experience analytics model to concurrently, dynamically, and adaptively validate and test the effects of user experience options among segments (groups) of current users, as a new technique for AB testing user experience options. The software system groups prior and current users into segments of users, based on the user characteristics (e.g., age, income, home ownership, time data, etc.) that are common to the segments of users. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provide superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

By providing personalized user experiences to users of a software system, and by unbiasing data samples that are used for determining users' preferences for user experience options, implementation of embodiments of the present disclosure allows for significant improvement to the fields of user experience, electronic tax return preparation, data analytics, data collection, and data processing, according to one embodiment. As one illustrative example, by unbiasing data samples that are used for determining users' preferences for user experience options, embodiments of the present disclosure allows for progressing a user through software system user flows and/or tax return preparation sessions with fewer processing cycles and less communications bandwidth because the user is more likely to receive preferred content, be satisfied, and be less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by unbiasing data samples that are used for determining users' preferences for user experience options, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, unbiasing data samples that are used for determining users' preferences for user experience options, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIG. 2 is a diagram of examples of personalized user experiences, in accordance with one embodiment.

FIG. 11 is a flow diagram of an example of a process for computing the effective performance of input estimates blended by Thompson Sampling, according to one embodiment.

Figure 1A:
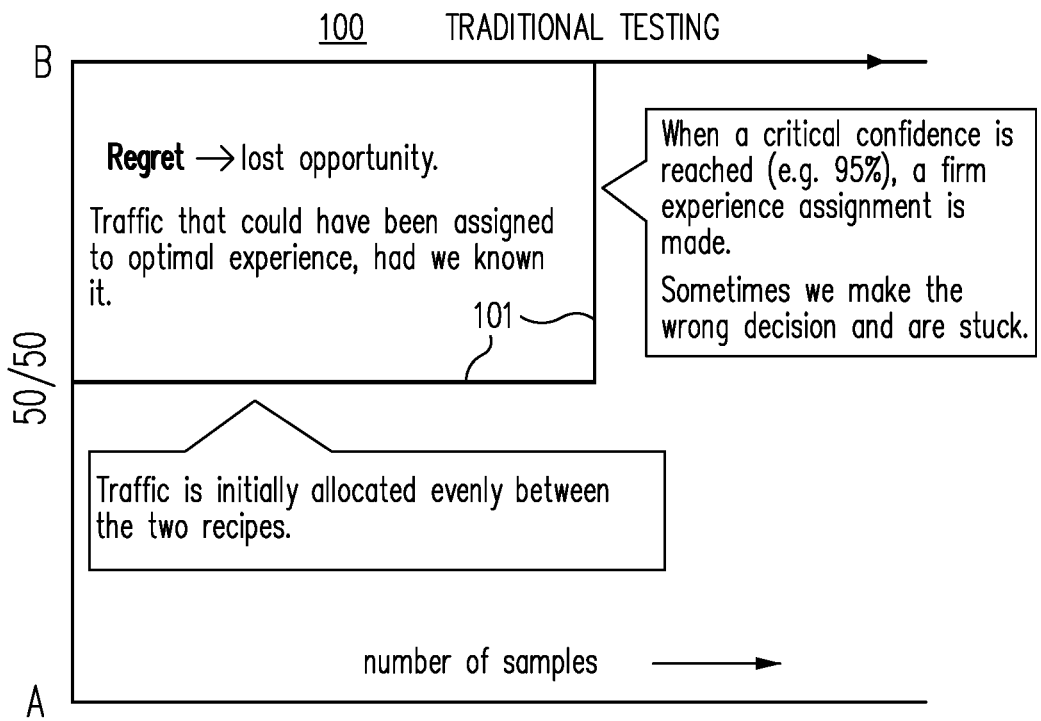
FIGS. 1A and 1B are graph diagrams of A/B testing techniques, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM section and PROCESS AND HARDWARE ARCHITECTURE section herein describe systems and processes suitable for unbiasing data samples that are used for determining users' preferences for user experience options, to provide personalized user experiences to software system users, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "decision tree" denotes a hierarchical tree structure, with a root node, parent nodes, and children nodes. The parent nodes are connected to children nodes through edges, and edge logic between parent nodes and children nodes performs a gating function between parent nodes and children nodes to permit or block the flow of a path from a parent node to a child node. As used herein, a node is associated with a node action that a model or process performs on a data sample or on a set of data samples.

As used herein, the term "segment" denotes a portion, section, or subset of a set of users (i.e., a user set). A segment can include an entire set of users or a portion of a set of users. As used herein a segment or sub-segment denotes a portion, section, or subset of users who have one or more user characteristics (as defined below) in common.

As used herein, the term distribution frequency rate denotes decimal numbers, fractions, and/or percentages that represent an average quantity of traffic for a segment of users to which one or more user experience options are delivered, with the software system. In alternative language, the term distribution frequency rate denotes decimal numbers, fractions, and/or percentages that represent an average quantity of traffic for a segment of users that is directed to one or more user experience options within a software system.

Process and Hardware Architecture

Disclosed herein is a production environment for identifying users' preferences for user experience options, by integrating the preferred user experience options into personalized user experiences, and by providing the personalized user experiences to users a software system, from the software system. The production environment includes a software system (e.g., a tax return preparation system) that applies a user experience analytics model to user characteristics of current users to identify the current users' preferences for user experience options, according to one embodiment. The user experience analytics model divides the current users into segments of current users, based on user characteristics of the current users, according to one embodiment. For each segment of current users, the model dynamically, adaptively, and concurrently provides preferred user experience options to some of the segment of current users and provides test user experience options to others of the segment of current users, according to one embodiment. By providing both preferred and test user experience options to the segments of current users, the user experience analytics model further validates expected levels of effectiveness of the preferred user experience options while concurrently testing/exploring the effectiveness of the test user experience options, according to one embodiment. Based on current users' responses to the preferred and test user experience options, the software system dynamically and adaptively sends the preferred user experience options to a higher percentage of future users and sends the non-preferred/test user experience options to a lower percentage of future users, according to one embodiment. As a result, a higher percentage of current users of the software system receive one or more user experience options that are aligned with the current users' preferences for user experience options, according to one embodiment. The more the software system provides users with preferred user experience options, the more likely the users are to perform one or more actions towards becoming paying customers, repeat customers, and/or satisfied customers, according to one embodiment.

Sampling bias is a bias in which a sample is collected such that some members of a population are less likely to be included or are less likely to receive a user experience option than others. Sampling bias results in data sets where users are not allocated to experiences with equal probability. Biased samples, if not corrected, will cause a user experience analytics model to erroneously identify user preferences because the performance determination for user experience options for particular segments of users is based on the assumption that users have a relatively equal likelihood of receiving the user experience options. The software system dynamically and adaptively improves the ability of user experience analytics models to identify and provide preferred user experience options, by unbiasing data samples to generate updated versions of user experience analytics models, using the data samples of prior users who received user experience options through one or more existing/prior versions of user experience analytics models, according to one embodiment.

Data samples of prior users, who received user experience options through one or more user experience options allocation/distribution schemes, are biased. For example, data samples of prior users are biased when, for example, prior users received user experience options with an arbitrary user experience allocation (e.g., a predetermined percentage or number of users receive one user experience option or another), without consideration for particular attributes or characteristics of the users. As another example, data samples of prior users are biased when, for example, one or more existing/prior versions of user experience analytics models were used to distribute user experience options to the prior users. As yet another example, data samples of prior users are biased when, for example, the data samples are a combination of: prior users who received user experience options based on a user experience analytics model; prior users who received user experience options based on an arbitrary allocation of user experience options; and/or prior users who did not receive a particular user experience option of interest. The data samples of prior users are biased because the user experience analytics model and/or the arbitrary distribution scheme disproportionately delivers user experience options to the prior users, e.g., based on differences in the user characteristics of the prior users. Thus, if two segments of prior users received different user experience options based on a particular allocation/distribution scheme, one segment of the prior users is less likely to have received the same user experience options as the other segment of prior users, by definition of the particular allocation/distribution scheme used to allocate/distribute user experience options to the prior users of the software system, according to one embodiment.

Because the software system uses data samples from prior users to define and/or generate new versions of user experience analytics models, the software system unbiases the data samples from the prior users, to reduce the likelihood of erroneous operation of the new versions of user experience analytics models, according to one embodiment. The software system unbiases the data samples from the prior users by: determining which one or more decision trees were used by the existing versions of user experience analytics models to identify user experience options for the prior users; calculating a bias weight for each leaf node of each of the decision trees; applying a bias weight to each of the data samples of prior users; and generating decision tree nodes for a decision tree of a new user experience model, based on the performance of the user experience options received by the prior users, according to one embodiment.

A user experience analytics model includes algorithmic logic that is used to determine current users' preferences for user experience options, according to one embodiment. The software system uses the user experience analytics model to concurrently, dynamically, and adaptively validate and test the effects of user experience options among segments (groups) of current users, as a new technique for A/B testing user experience options. The software system groups prior and current users into segments of users, based on the user characteristics (e.g., age, income, home ownership, time data, etc.) that are common to the segments of users. The user experience analytics model determines likely preferences for current users based on the preferences of prior users, and the software system applies at least two different user experience options to the current users of a segment to validate some users' preference for one of the user experience options and to test other users' preference for the other of the user experience options. By dynamically adapting the frequency with which the two different user experience options are delivered to current users of a particular segment, the software system dynamically adapts and improves the accuracy with which the software system delivers user experience options that are actually or likely to be preferred by the current users of the software system, according to one embodiment. The software system analyzes user responses to the user experience options to update the user experience analytics model and to dynamically adapt the personalization of the user experience options, at least partially based on feedback from users, according to one embodiment. In one embodiment, the software system is a tax return preparation system.

Embodiments of the disclosed software system provide superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to prefer. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

Figure 1B:
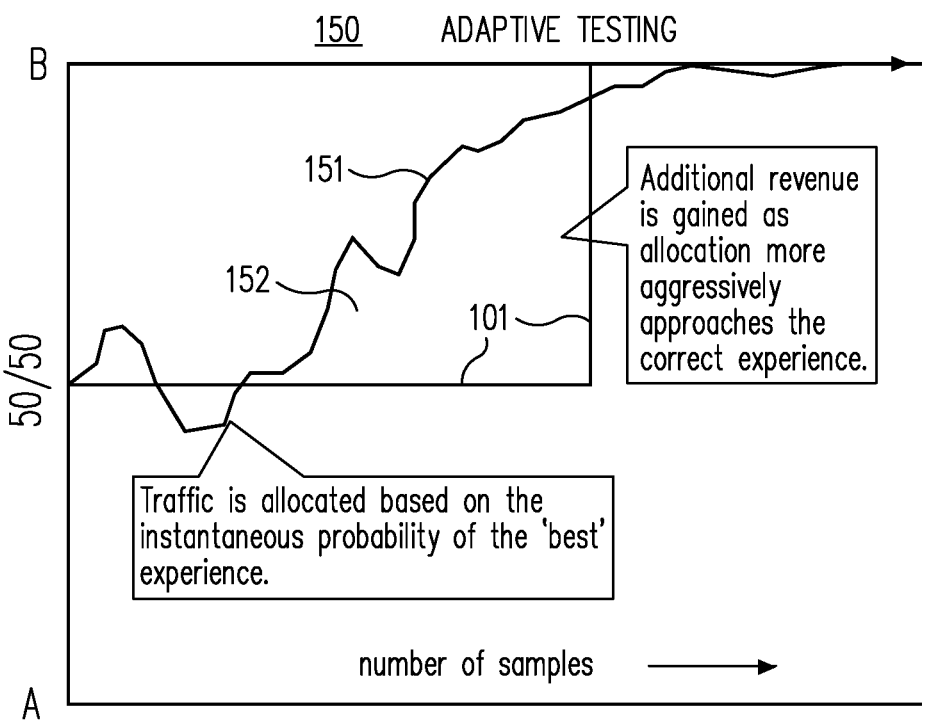

FIGS. 1A and 1B are graphical representations of some of the advantages of adaptive A/B testing over traditional A/B testing, according to one embodiment. FIG. 1A is an example of a graph 100 that illustrates delivery of a condition A to 50% of a user set and delivery of a condition B to 50% of a user set for a number of samples (x-axis), using traditional A/B testing techniques. Conditions A and B are equally distributed to the user sets until a critical confidence level is reached, e.g., 95%. After the critical confidence level is reached, traditional testing techniques switch to delivering the more successful of the conditions to 100% of the user set. In the graph 100, the test switches at a number of samples, represented by graph line 101, that were tested until a confidence level (e.g., 95%) was reached. Everything above and to the left of the graph line 101 represents lost opportunity to provide condition B to the user set rather than condition A (condition A ultimately being deemed inferior).

FIG. 1B shows a graph 150 that illustrates an adaptive delivery of condition A (e.g., a first user experience option) and condition B (e.g., a second user experience option) to the user set while determining which condition is superior to the other, according to one embodiment. The graph 150 includes a graph line 151 that represents a percentage of condition B that is allocated to the user set, according to one embodiment. The area 152 that is under the graph line 151 illustrates that more users of the user set receive condition B sooner by using adaptive A/B testing instead of the traditional A/B testing illustrated by FIG. 1A, according to one embodiment. Importantly, providing condition B sooner equates to providing more users with user experiences that are in accordance with the users' preferences and that are more likely to assist users in completing or accomplishing a particular activity (e.g., providing personal information, paying for a service, signing up as a service provider customer, staying logged in to a user session, complete filing a tax return, etc.), according to one embodiment. Thus, implementation of adaptive testing by providing personalized user experiences in a software system, as disclosed herein, translates to increases in quantities of satisfied customers and improved revenue for the service provider of the software system, according to one embodiment. The systems, methods, algorithms, and techniques of FIGS. 5-12 disclose various embodiments that leverage the advantages of adaptive testing as described with respect to FIGS. 1A and 1B, according to one embodiment.

FIG. 2 illustrates an example embodiment of a personalized user experience 200 and a personalized user experience 210, which can be delivered to a user via a software system, at least partially based on characteristics of the user, to increase user satisfaction with the user experience and to cause the user to perform one or more actions (e.g., answer a question, provide personal information, file a tax return, remain logged in to the software system, etc.), according to one embodiment. The personalized user experiences 200 and 210 display several optional versions of a software system that can be purchased or used to prepare a tax return for the user, according to one embodiment. The personalized user experience 200 includes a number of icon buttons 201, representing a user experience option A, according to one embodiment. The personalized user experience 210 includes a text banner 211, representing a user experience option B, according to one embodiment. The analytics model used by the software system provides the personalized user experience 200 or the personalized user experience 210 to users, based on the user characteristics of the users, based on the segment associated with the users, and/or based on the likelihood that the users will have a preference for the user experience option A or the user experience option B, according to one embodiment. The personalized user experiences 200 and 210, the icon buttons 201, and the text banner 211, are merely a few examples of hundreds or thousands of possible variations of personalized user experiences and of user experience options that can be identified, generated, and/or delivered to users based on the users' preferences for user experience options, to encourage the users to perform one or more actions towards becoming a paying customer of a tax return preparation system or of another service provided by a service provider, according to one embodiment.

Figure 3A:
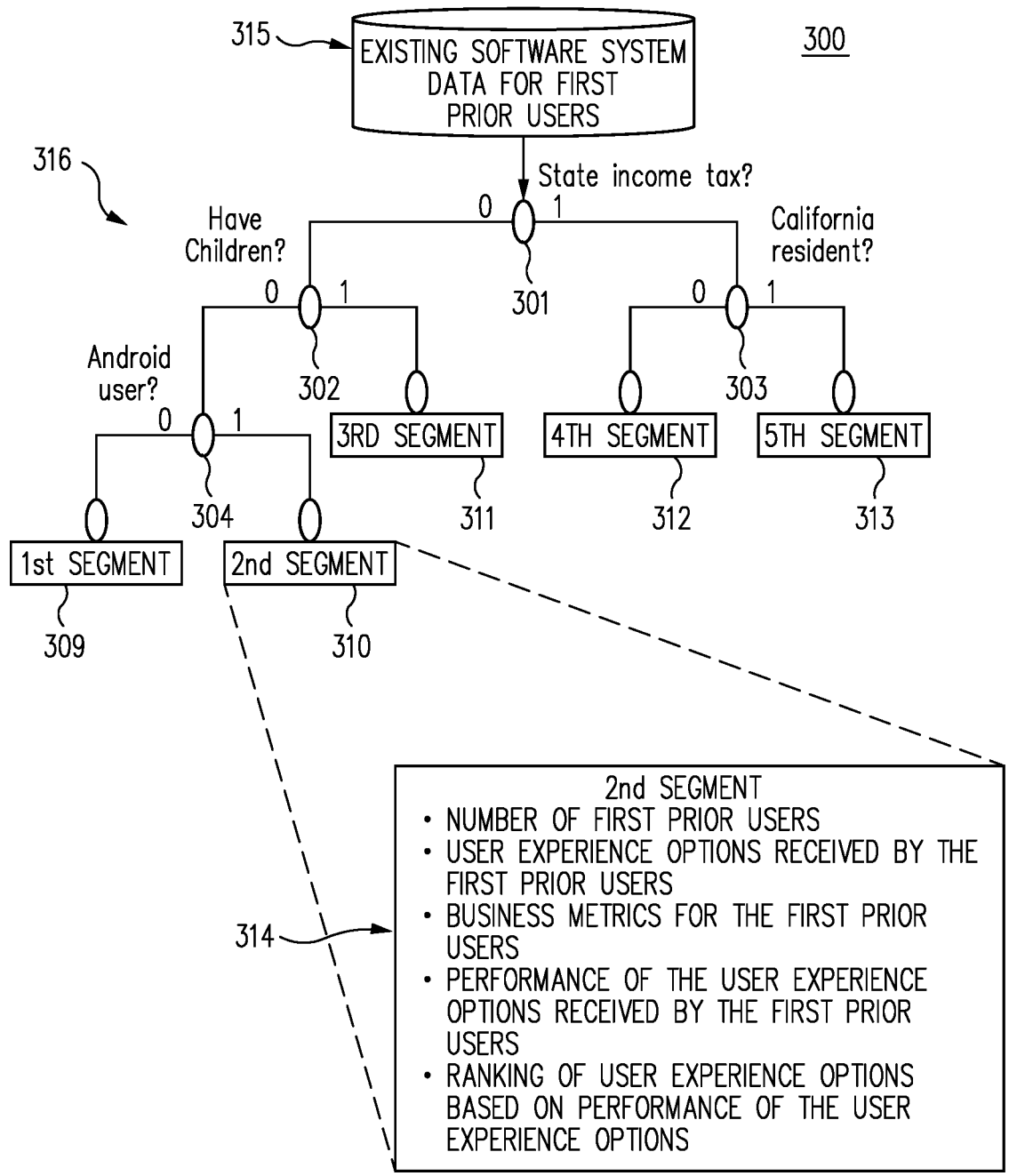
FIGS. 3A, 3B, and 3C are example diagrams of decision tree configurations that show sources of sampling biases and solutions for resolving sampling biases for user experience analytics models, in accordance with one embodiment.
Figure 3B:
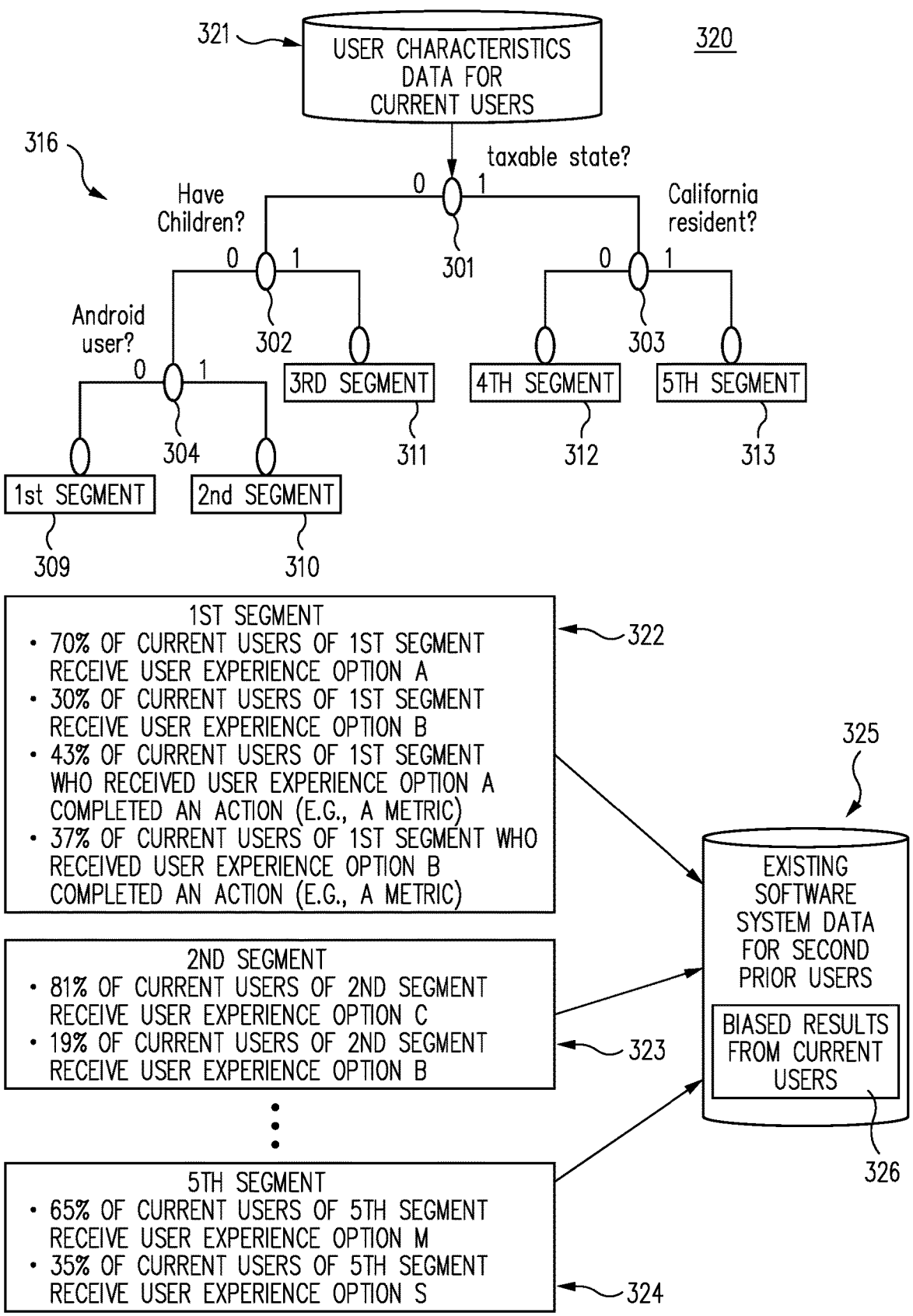
Figure 3C:
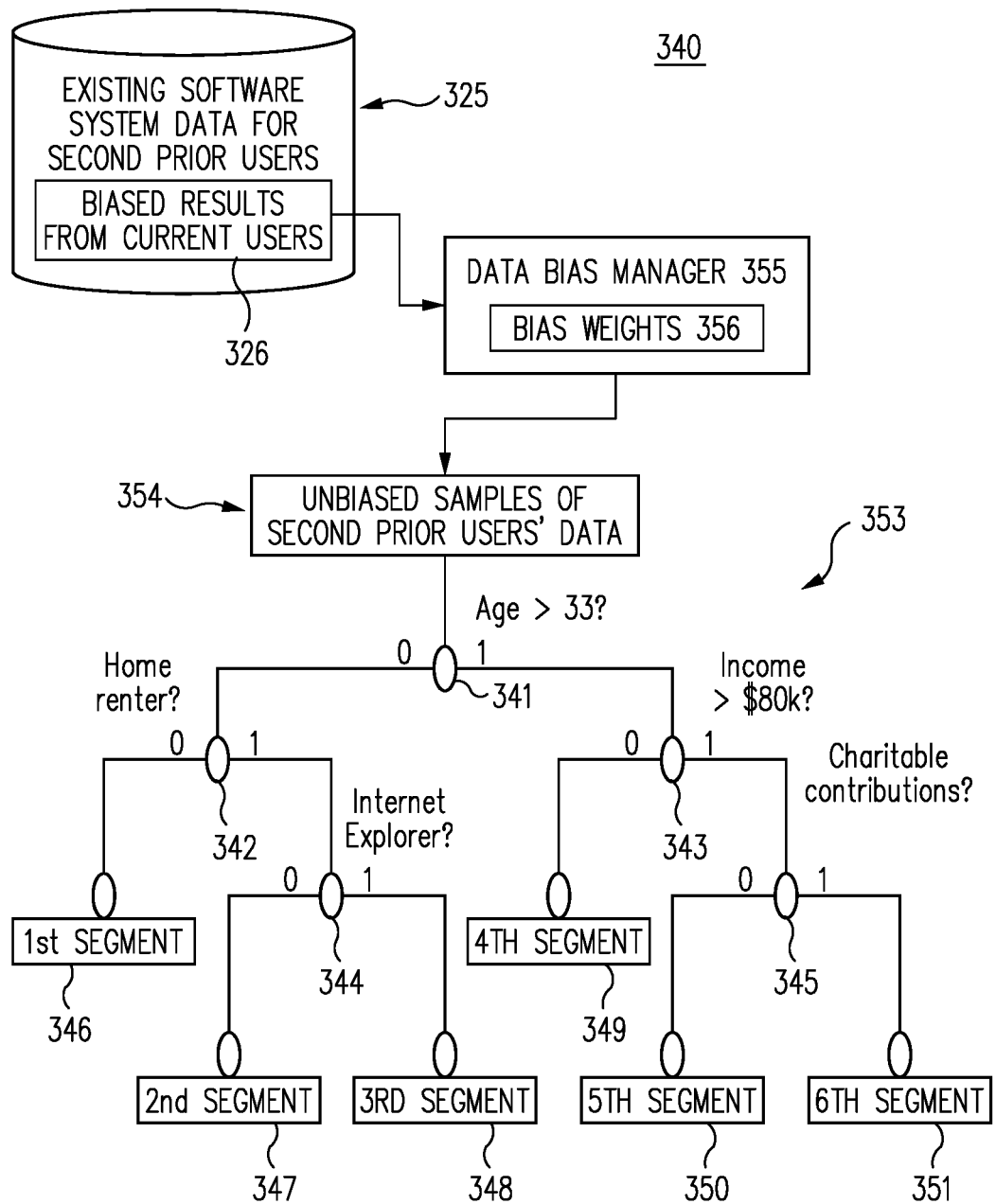

FIGS. 3A, 3B, and 3C illustrate decision tree configurations that show sources of sampling biases and solutions for resolving sampling biases that become part of data produced by and used by one or more user experience analytics models, according to one embodiment. FIGS. 3A, 3B, and 3C illustrate one example sequence of the iterative technique that can be used to adaptively improve identification of user preferences for user experience options, according to one embodiment. As summarized above, a software system applies user characteristics of current users to a user experience analytics model in order to determine user preferences for user experience options, according to one embodiment. A user experience analytics model includes one or more decision trees to analyze the user characteristics to determine which user experience options to deliver to the current users, according to one embodiment. The decision trees are iteratively defined, used, and redefined, for user experience analytics models, as discussed hereafter, according to one embodiment.

FIG. 3A illustrates a decision tree configuration 300 that includes a decision tree 316 that is defined by existing software system data for first prior users 315, according to one embodiment. The defined decision tree 316 can be used by a software system as a user experience analytics model or as part of a user experience analytics model, according to one embodiment.

The existing software system data for first prior users 315 includes multiple data samples, and each of the multiple data samples represents one of the first prior users, according to one embodiment. The existing software system data for first prior users 315 (e.g., the data samples) includes user characteristics for each of the first prior users, identification of which user experience option was received by each of the first prior users, and the business metrics associated with responses provided by and/or actions taken by each of the first prior users in response to receipt of a user experience option, according to one embodiment. The term "business metrics" is interchangeably used herein with the term "metrics", and the business metrics include, but are not limited to, whether or not a user becomes a paying customer (e.g., conversions), how much money a software system receives from the user, whether user clicks on a particular hyperlink, whether user answers questions, whether user provides additional personal information, the duration that a user remains logged into the software system, whether a user refers an acquaintance to use the software system, whether user files a tax return with the software system, and the like, according to one embodiment.

Defining the decision tree 316 includes: separating the first prior users into segments of first prior users based on the user characteristics of the first prior users; identifying which user experience options were received by the first prior users of each segment of first prior users; and evaluating one or more of the business metrics to determine which user experience options correlate and/or correspond with a higher likelihood of a prior user to perform a particular business metric, according to one embodiment. In one embodiment, the disclosed software system uses one or more of the methods and/or techniques described in process 600, decision tree 700, process 800, process 900, process 1000, and/or process 1100 (shown in FIGS. 6, 7, 8, 9, 10, and/or 11, respectively) to define the decision trees disclosed herein, according to one embodiment.

The decision tree 316 includes decision nodes for categorizing the first prior users, and the decision tree 316 includes leaf nodes (that represent segments of users) to determine user preferences for user experience options within the software system, according to one embodiment. In particular, the decision tree 316 includes decision nodes 301, 302, 303, and 304, and the decision tree 316 includes leaf nodes 309, 310, 311, 312, and 313, according to one embodiment.

The decision nodes 301, 302, 303, and 304 segment the first prior users of the existing software system data for first prior users 315, based on decision node logic or edge logic, according to one embodiment. A "1" in the decision node logic is interpreted as "yes", and a "0" in the decision node logic is interpreted as "no", according to one embodiment. The decision node logic segments the first prior users of the existing software system data for first prior users 315, based on the user characteristics of the first prior users and based on the performance of one or more particular user experience option among the particular segment of first prior users, according to one embodiment. Examples of decision node logic includes, but is not limited to, whether a prior user is responsible for state income tax, whether a prior user has children, whether a prior user is a California resident, and whether a prior user is an android operating system user, according to one embodiment.

The leaf nodes 309, 310, 311, 312, and 313 include leaf node characteristics that are analyzed by the software system to determine the likelihood of effectiveness of user experience options, when the user experience options are provided to the users who have user characteristics that satisfy the criteria of a leaf node, according to one embodiment. In the example of decision tree 316, the leaf node 309 includes a first segment (of first prior users), the leaf node 310 includes a second segment (of first prior users), the leaf node 311 includes a third segment (of first prior users), the leaf node 312 includes a fourth segment (of first prior users), and the leaf node 313 includes a fifth segment (of first prior users), a according to one embodiment. In the example of the decision tree 316, the first prior users of the existing software system data for first prior users 315 who satisfied the criteria for the leaf node 310 are categorized as a second segment (of first prior users) and have user characteristics that indicate that they are not liable for a state income tax, that they do not have children, and that they are android operating system users, according to one embodiment.

Leaf node characteristics 314 are example leaf node characteristics for the leaf node 310 for the second segment (of first prior users), according to one embodiment. The leaf node characteristics 314 are part of the characteristics of the user experience analytics model, and include user characteristics criteria (e.g., decision node logic or edge logic) for associating one or more of the first prior users with the leaf node 310, according to one embodiment. The leaf node characteristics 314 also include the number of first prior users of the second segment (e.g., the sample size associated with the leaf node 310), identification of the user experience options received by the first prior users of the second segment (e.g., user experience options A, B, and C), business metrics for the first prior users (e.g., how many users filed their tax return after receiving user experience option A), identification of the performance of the user experience options among the first prior users of the second segment (e.g., what percentage users filed their tax return after receiving user experience option A as compared to a percentage of users who filed their tax return after receiving a user experience option B), and, optionally, a ranking of the user experience options based on performance, according to one embodiment. In one embodiment, the performance of the user experience options among the first prior users of the second segment is proportional to a likelihood of effectiveness of the user experience options. Although the leaf node characteristics 314 are described for the leaf node 310, each of the leaf nodes 309, 310, 311, 312, and 313 include similar leaf node characteristics, according to one embodiment.

FIG. 3B illustrates a decision tree configuration 320 that uses the decision tree 316 to analyze user characteristics data for current users 321 in order to identify and provide preferred user experiences options to the current users, according to one embodiment. The decision tree 316 identifies the preferred user experience options based on user characteristics of each current user and based on the leaf node characteristics of each of the leaf nodes 309, 310, 311, 312, and 313, according to one embodiment.

Upon application of the user characteristics data for current users 321 to the decision tree 316, the decision tree configuration 320 results in decision tree segment performances for each of the segments of current users, according to one embodiment. The decision tree segment performances for each of the segments of current users include a decision tree segment performance 322 for the first segment (of current users), the decision tree segment performance 323 for the second segment (of current users), the decision tree segment performance 324 of the fifth segment (of current users), and other decision tree segment performances associated with the third and fourth segments (of current users), according to one embodiment.

Each of the decision tree segment performances 322, 323, and 324 illustrate examples of distribution frequency rates for user experience options to the current users that are categorized into a particular segment, according to one embodiment. For example, the decision tree segment performance 322 shows that the decision tree 316 was configured to provide user experience A to 70% of the current users categorized into the first segment (i.e., into the leaf node 309) and was configured to provide user experience option B to 30% of the current users categorized into the first segment, according to one embodiment. Thus, for this example, the distribution frequency rate for user experience option A is 0.7 and the distribution frequency rate for user experience option B is 0.3, according to one embodiment. In one embodiment, the distribution frequency rate is based on user experience option allocations that are based on all of the segments of current users and are therefore much smaller. In one embodiment, the likelihood of effectiveness on the segment of current users of the user experience A is 0.7 (or 70%) and the likelihood of effectiveness on the segment of current users of the user experience B is 0.3 (or 30%). As summarized above, providing two different user experience options to a segment of current users enables the software system to provide preferred user experience options (e.g., user experience option A), while continuing to test the effectiveness of one or more test user experience options (e.g., user experience B), according to one embodiment.

The decision tree segment performances also include business metrics that are used for determining/re-evaluating the effectiveness/performance of user experience options on the current users, according to one embodiment. For example, the decision tree segment performance 322 also includes that 43% of the current users of the first segment who received user experience option A completed one or more actions associated with a business metric (e.g., filed a tax return, paid for a tax return preparation service, provided personal information, etc.). The decision tree segment performance 322 also includes that 37% of the current users of the first segment who received user experience option B completed one or more actions associated with a business metric. The values provided in the decision tree segment performances 322, 323, and 324 are merely illustrative examples of how the decision tree configuration 320 could distribute user experience options to current users in order to determine the performance of the decision tree 316, according to one embodiment.

The current users of the user characteristics data for current users 321 become prior users of the software system, for data processing purposes, after the decision tree 316 is used to provide user experience options to the users, according to one embodiment. Performance data for the current users of the user characteristics data for current users 321 is combined with the user characteristics data for current users 321 and are stored in a table, database, or other data structure, as existing software system data for second prior users 325, according to one embodiment.

The existing software system data for second prior users 325 includes biased results from current users 326, i.e., non-random samples of a population of software system users, according to one embodiment. The biased results from current users 326 are biased because the current users were categorized based on their user characteristics and were provided with specific user experience options based on the segment into which the current users were categorized. In other words, if the current users that were categorized into the first segment only received user experience option A or user experience option B, then the current users that were categorized into the first segment were less likely to receive user experience option M or user experience option S (like the current users who were categorized into the fifth segment), according to one embodiment.

The sampling bias of the existing software system data for second prior users 325 and of the biased results from current users 326 becomes problematic when defining a new decision tree based on the biased samples. Based on business metrics criteria (e.g., low percentages of conversion to paying customers) or other service provider criteria, the software system may choose to formulate, define, or generate new decision trees for a new user experience analytics model, according to one embodiment. The new decision trees, when defined, may have different decision node logic or criteria for categorizing user samples, so the sampling biases of the existing software system data for second prior users 325 may result in erroneous performance calculations and cause the new decision tree to poorly match additional current users with the additional current users' preferences for user experience options, according to one embodiment.

FIG. 3C illustrates an example of a decision tree configuration 340 that includes a new decision tree 353 that is defined by data samples from the existing software system data for second prior users 325, according to one embodiment. In one embodiment, the data samples from the existing software system data for second prior users 325 are unbiased prior to defining the new decision tree 353. In one embodiment, the new decision tree 353 is defined with the data samples from the existing software system data for second prior users 325 and the metrics (e.g., business metrics, such as estimated conversion rate) are unbiased after the new decision tree 353 is defined, to determine whether or not the characteristics of the new decision tree 353 are good enough to implement the new decision tree 353 into production.

The decision tree configuration 340 includes a data bias manager 355 for unbiasing at least part of the existing software system data for second prior users 325, to enable the software system to generate the new decision tree 353 based on the responses of prior users of the software system, according to one embodiment. The data bias manager 355 retrieves/receives the biased results from current users 326 from the existing software system data for second prior users 325, according to one embodiment. The data bias manager 355 identifies the one or more user experience analytics models and the one or more decision trees that introduced bias into the biased results from current users 326, according to one embodiment. The data bias manager 355 analyzes the leaf node characteristics of each leaf node of each decision tree that introduced highest into the biased results from current users 326, according to one embodiment. Based on the leaf node characteristics of each leaf node of each decision tree, the data bias manager 355 determines bias weights 356, according to one embodiment. The bias weights 356 quantify an amount of sampling bias that was introduced into the biased results from current users 326 and/or introduced into the existing software system data for second prior users 325, according to one embodiment.

The data bias manager 355 applies the bias weights 356 to the biased results from current users 326 to generate the unbiased samples of second prior users' data 354, according to one embodiment. In one embodiment, the data bias manager 355 applies the bias weights 356 to the business metrics (e.g., user responses or user actions) that were responsive to segments of users receiving one or more user experience options, according to one embodiment. By weighting the business metrics, the data bias manager 355 adjusts the quantity of credibility or weight of each data sample to account for the non-random context in which the business metrics were generated, according to one embodiment. In other words, if a first segment of current users only received user experience options A and B, and performs an action (which is used to determine a business metric) in response to receiving only one of the two experiences, the data bias manager 355 adjusts the business metric to account for the fact that the business metric does not account for what the first segment of current users might have done had they received user experience options C, D, or E, for example. Because the business metrics are used to determine the performance of user experience options, weighting the business metrics appropriately improves assumptions, calculations, and/or determinations made by the software system about the likelihood of effectiveness of the user experience options, according to one embodiment.

The software system uses the unbiased samples of second prior users' data 354 to define and generate the new decision tree 353, according to one embodiment. The software system uses one or more of the methods and/or techniques described in process 600, decision tree 700, process 800, process 900, process 1000, and/or process 1100 (shown in FIGS. 6, 7, 8, 9, 10, and/or 11, respectively) to define the new decision tree 353, according to one embodiment. The resulting example of the new decision tree 353 includes nodes 341, 342, 343, 344, 345, 346, 347, 348, 349, 350, and 351, according to one embodiment. As illustrated, the new decision tree 353 includes different decision node logic and different quantities of leaf nodes than the decision tree 316, according to one embodiment. In one embodiment, defining new decision trees using updated data samples results in the same decision node logic and the same quantities of leaf nodes as previous versions of decision trees.

Figure 4:
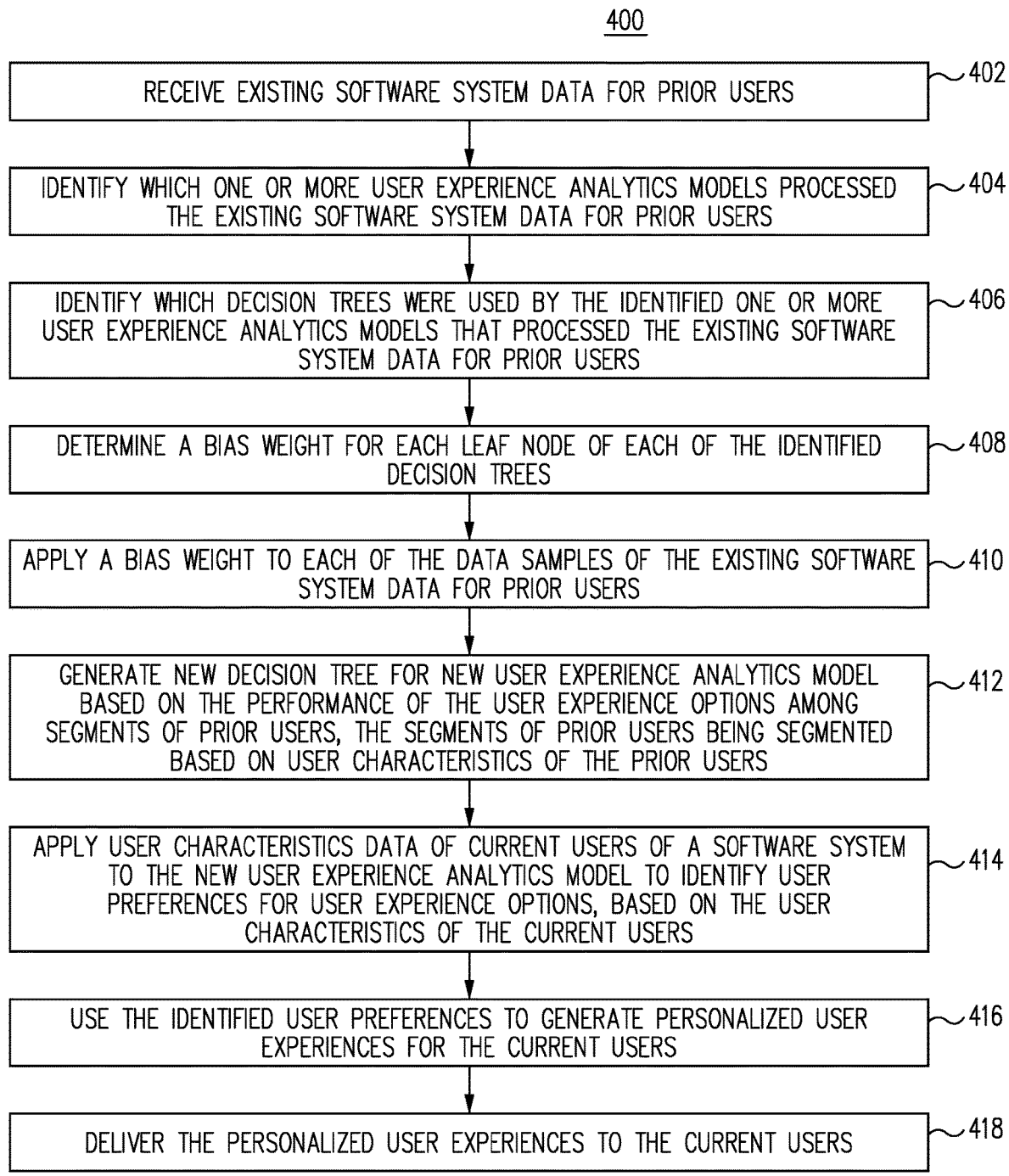
FIG. 4 is a flow diagram of a process for unbiasing data samples that were biased through one or more existing decision trees of one or more existing user experience analytics models of a software system, in accordance with an embodiment.

FIG. 4 illustrates a process 400 for unbiasing data samples that were biased through one or more existing decision trees of one or more existing user experience analytics models of a software system, according to one embodiment.

At operation 402, the process receives existing software system data for prior users, according to one embodiment. The existing software system data for prior users can be stored by the software system and/or can be received from one or more other storage device associated with or operated by the service provider of the software system, according to one embodiment. In one embodiment, the prior users are any users who have interacted with the software system and who have received user experience options at least partially based on one or more user characteristics. The existing software system data for prior users includes, but is not limited to, user characteristics for the prior users, identifiers of one or more user experience options received by the prior users, responses and/or actions taken by the prior users in response to receipt of the user experience options, and business metrics used to quantify the success of the software system and/or the user experience options and/or the user experience analytics models, according to one embodiment.

At operation 404, the process identifies which one or more user experience analytics models processed the existing software system data for prior users, according to one embodiment. In one embodiment, a user experience analytics model identifier is stored with the existing software system data for prior users to simplify the identification of user experience analytics models that have processed the existing software system data for prior users, according to one embodiment.

At operation 406, the process identifies which decision trees were used by the identified one or more user experience analytics models that process the existing software system data for prior users, according to one embodiment. In one embodiment, a decision tree identifier is stored with the existing software system data for prior users to simplify the identification of decision trees that have processed the existing software system data for prior users, according to one embodiment.

At operation 408, the process determines bias weights for each leaf node of each of the identified decision trees, according to one embodiment.

The process determines a bias weight for each data sample by identifying the likelihood that a prior user for the data sample would receive a particular user experience option based on the user characteristics for the prior user, according to one embodiment.

At operation 410, the process applies a bias weight to each of the data samples of the existing software system data for prior users, according to one embodiment. In one embodiment, the process applies a bias weight to each of the data samples by applying the bias weight to a business metric (e.g., conversion rate, or expectation/estimate of conversion rate) associated with a data sample. To unbias a data sample, the process divides a business metric for the data sample by the bias weight, according to one embodiment. In one embodiment, the process modifies one or more attributes of the data sample (e.g., a business metric, an estimated business metric, a distribution frequency rate, etc.) for a data sample by making the one or more attributes of the data sample inversely proportional (e.g., by division or multiplication) to the bias weight, according to one embodiment. The process determines and applies an individual bias weight for each user experience option that could have been provided to the prior user of the data sample, according to one embodiment.

At operation 412, the process generates a new decision tree for a new user experience analytics model based on the performance of the user experience options among segments of prior users, the segments of prior users being segmented based on user characteristics of the prior users, according to one embodiment. To define the new decision tree, the process uses one or more of the methods and/or techniques described in process 600, decision tree 700, process 800, process 900, process 1000, and/or process 1100 (shown in FIGS. 6, 7, 8, 9, 10, and/or 11, respectively), according to one embodiment.

In one embodiment, operation 412 occurs before operation 410. The process first defines a new decision tree using the biased data samples of the existing software system data for the prior users, according to one embodiment. After the new decision tree is defined, the likelihood of a user to receive a particular user experience in the new decision tree is divided by the likelihood of a user to receive the particular user experience option in an existing decision tree that biased the data sample, according to one embodiment. The likelihood of a user to receive a particular user experience, based on the user's user characteristics is the distribution frequency rate, according to one embodiment. The ratio of the distribution frequency rate from a new decision tree divided by the distribution frequency rate of a prior/existing decision tree, for a user and for a particular user experience option, is used to estimate the performance (e.g., a business metric) of the new decision tree, according to one embodiment. In one embodiment, the bias weight is simply determined as one divided by the historical probability that a prior user received a user experience option, with the probability based on the user characteristics associated with that prior user. In other words, bias weights is simply determined as the inverse of the distribution frequency rate for each leaf node of a decision tree, according to one embodiment.

At operation 414, the process applies user characteristics data of current users of the software system to the new user experience analytics model to identify user preferences for user experience options, based on the user characteristics of the current users, according to one embodiment.

At operation 416, the process uses the identified user preferences to generate personalized experiences for the current users, according to one embodiment. The process generates personalized user experiences by combining user element data representing user elements with user experience option data representing identified user experience options, according to one embodiment. The personalized user experiences are represented by personalized user experience data or personalized user experience display data, according to one embodiment.

At operation 418, the process delivers the personalized user experiences to the current users, according to one embodiment. The process delivers the personalized user experiences to the current users by transmitting personalized user experience data or personalized user experience display data to computing devices of the current users, according to one embodiment.

Figure 5:
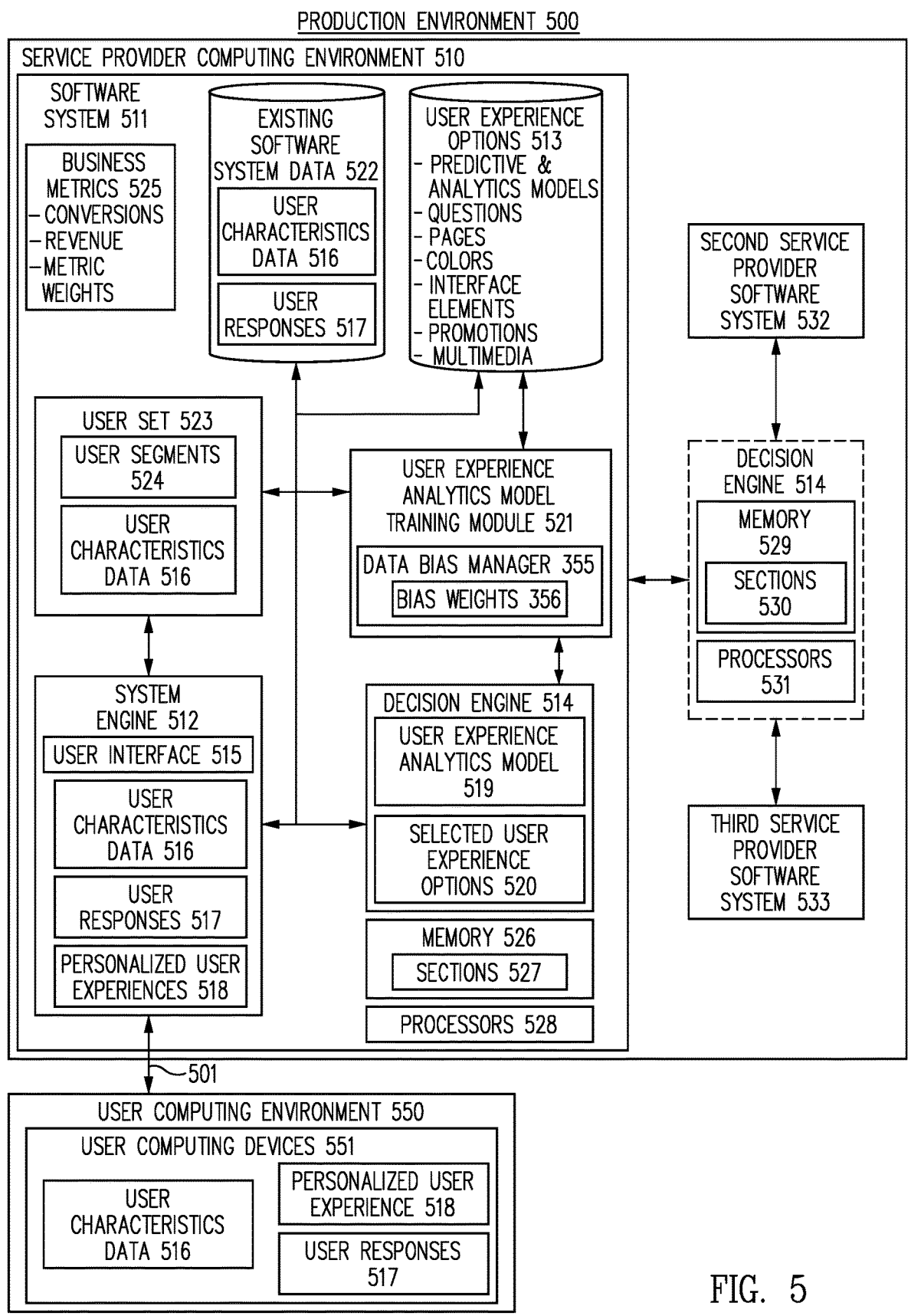
FIG. 5 is a block diagram of example architecture for adaptively providing personalized user experiences, in accordance with one embodiment.

FIG. 5 illustrates an example embodiment of a production environment 500 for adaptively providing personalized user experiences in a software system, e.g., a tax return preparation system. The production environment uses a bias manager and/or bias weights to unbias data samples, to increase the likelihood of accurately predicting or determining user preferences for user experience options, based on user characteristics of users of the software system, according to one embodiment. The production environment 500 includes a service provider computing environment 510 and a user computing environment 550 to deliver personalized user experiences to users of a software system, to cause the users to perform one or more particular actions (e.g., answer a sequence of questions, continue use of the software system, file a tax return, etc.), according to one embodiment. The computing environments 510 and 550 are communicatively coupled to each other with a communication channel 501, according to one embodiment.

The service provider computing environment 510 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 510 represents a traditional data center computing environment, a virtual asset computing environment (e.g., a cloud computing environment), or a hybrid between a traditional data center computing environment and a virtual asset computing environment, to host one or more software systems, according to one embodiment. The one or more software systems can include, but are not limited to tax return preparation systems, other financial management systems, and applications that support the tax return preparation systems and/or the other financial management systems, according to one embodiment. The service provider computing environment 510 includes a software system 511 that adaptively provides personalized user experiences by directing users to user experience options in accordance with distribution frequency rates, at least partially based on user characteristics for the users, according to one embodiment. By adaptively providing personalized user experiences, the software system 511 improves user satisfaction, increases service provider revenue, facilitates user interactions with user interfaces, determines user preferences for user experience options, while concurrently, automatically, and seamlessly increasing user traffic to well-performing user experience options in the software system 511, according to one embodiment. The software system 511 includes various components, databases, engines, modules, and data to support adaptively providing personalized user experiences to users of the software system 511, according to one embodiment. The software system 511 includes a system engine 512, user experience options 513, and a decision engine 514, according to one embodiment.

The system engine 512 is configured to communicate information between users and the software system 511, according to one embodiment. The system engine 512 executes/hosts a user interface 515, according to one embodiment. The system engine 512 executes/hosts the user interface 515 to receive user characteristics data 516 and to receive user responses 517 from users, in response to personalized user experiences 518 provided to the users by the software system 511, according to one embodiment. The user interface 515 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the information from users, according to one embodiment.

The system engine 512 and/or the software system 511 communicates with the user through the user computing environment 550, according to one embodiment. The user computing environment 550 includes user computing devices 551 that are representative of computing devices or computing systems used by users to access, view, operate, and/or otherwise interact with the software system 511, according to one embodiment. The term "users" and "user computing devices" are used interchangeably to represent the users of the software system 511, according to one embodiment. Through the user computing devices 551, users provide the user characteristics data 516 and provide the user responses 517 to the software system 511, in response to receipt of the personalized user experiences 518, according to one embodiment.

The user characteristics data 516 represents user characteristics for users of the software system 511, according to one embodiment. The user characteristics data 516 can include information from existing software system data 522, such as one or more previous years' tax return data for a particular user and previous user interactions with the software system 511. The user characteristics data 516 is stored in a data store, a database, and/or a data structure, according to one embodiment. The user characteristics data 516 also includes information that the software system 511 gathers directly from one or more external sources such as, but not limited to, a payroll management company, state agencies, federal agencies, employers, military records, public records, private companies, and the like, according to one embodiment. Additional examples of the user characteristics (represented by the user characteristics data 516) include, but are not limited to, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, add click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The system engine 512 provides personalized user experiences 518, by populating and/or using one or more user experience options 513 in the personalized user experience 518, according to one embodiment. The user experience options 513 include predictive and analytics models that can be used to determine relevant topics to present to the user; questions to present to user; sequences of topics to present to user; sequences of questions to present to user; and the like, according to one embodiment. The user experience options 513 also include, but are not limited to, questions, webpages, sequences of pages, colors, interface elements, positioning of interface elements within webpages, promotions that can be offered to users, audio files, video files, other multimedia, and the like, according to various embodiments.

Users of the software system 511 will have individual preferences, technical competency levels, levels of education, levels of comfort using digital technologies, and other distinctive or individual characteristics that increase the value of personalized user experiences of the software system 511 for the users. To improve the likelihood of satisfaction of the user with his experience with the software system 511, the system engine 512 selectively applies one or more of the user experience options 513 to the personalized user experiences 518 while facilitating interactions between the software system 511 and the users, according to one embodiment.

The software system 511 uses the decision engine 514 to identify which user experience options 513 to apply to the personalized user experiences 518, in order to facilitate or promote one or more particular user actions (e.g., such as completing a set of questions, continuing to use the software system 511, filing a tax return with the software system 511, etc.), according to one embodiment. The decision engine 514 is configured to receive the user characteristics data 516, receive the user experience options 513, and select one or more of the user experience options 513 for the system engine 512 to integrate into the personalized user experiences 518 for users of the software system 511, according to one embodiment.

The decision engine 514 applies the user characteristics data 516 and the user experience options 513 to a user experience analytics model 519, to determine which user experience options 513 to apply to users with particular user characteristics, according to one embodiment. The user experience analytics model 519 returns distribution frequency rates for user experience options 513, based on the user characteristics data 516, according to one embodiment. The distribution frequency rates define a frequency with which users having particular user characteristics are directed to particular user experience options, according to one embodiment. In one embodiment, users are directed to particular user experience options, for example, via a universal resource locator ("URL"). In one embodiment, selected user experience options are delivered to users by modifying the content of personalized user experiences 518. "Directing users to user experience options" is used interchangeably with "providing users with user experience options", according to one embodiment.

The decision engine 514 uses the distribution frequency rates from the user experience analytics model 519 to generate a weighted pseudo-random number that represents the one or more user experience options that are to be provided to a user based on the user's user characteristics data, according to one embodiment. Examples of distribution frequency rates include 0.2 for a first user experience option, 0.5 for a second user experience option, and 0.3 for a combination of one or more other user experience options, according to one embodiment. In practice, 0.2, 0.5, and 0.3 distribution frequency rates means that for a particular user characteristic, 2 out of 10 users receive the first user experience option, 5 out of 10 users receive the second user experience option, and 3 out of 10 users receive the combination of one or more other user experience options, according to one embodiment. The decision engine 514 uses the distribution frequency rates and the weighted pseudo-random number to identify selected user experience options 520, for delivery to the user, according to one embodiment.

While the user experience options 513 are described as experience elements/features that are added to the personalized user experiences 518, the selected user experience options 520 can also include the omission of one or more user experience options 513. For example, the user experience analytics model 519 can be configured to generate distribution frequency rates of 0.8 and 0.2 for determining whether or not to display large icons in the personalized user experiences 518, according to whether the age, income level, employment status, education level, or other user characteristic is above or below one or more thresholds that are set within the user experience analytics model 519, according to one embodiment. In other words, the output of the user experience analytics model 519 can be Boolean and can simply determine whether a user receives a user experience option or not, based on the user's user characteristics, according to one embodiment.

The software system 511 uses, executes, and/or operates a user experience analytics model training module 521 to train (e.g., initialize and update) the user experience analytics model 519, according to one embodiment. The user experience analytics model training module 521 retrieves user characteristics data 516 from the existing software system data 522 and retrieves user experience options 513 for use in training the user experience analytics model 519, according to one embodiment. The user experience analytics model training module 521 initializes and/or updates the user experience analytics model 519 using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment.

In one embodiment, the user experience analytics model training module 521 defines a user set 523 that is based on all or part of the users that have interacted with the software system 511 and/or for whom user characteristics data 516 has been gathered or received. The user experience analytics model training module 521 defines a number of user segments 524 around subsets of commonly held user characteristics. In other words, the user segments 524 are subsets of the user set 523, and each of the user segments 524 have one or more user characteristics in common, according to one embodiment.

The user experience analytics model training module 521 trains the user experience analytics model 519 by generating a decision tree, based on how particular user experience options 513 perform with particular user segments 524, according to one embodiment. The user experience analytics model training module 521 generates a decision tree as part of the analytics logic for the user experience analytics model 519, to facilitate generating distribution frequency rates. The processes 600, 800, 900, 1000, and 1100, of FIGS. 6, 8, 9, 10, and 11 respectively, disclose particular embodiments that may be used by the user experience analytics model training module 521 for initializing and/or updating the user experience analytics model 519, according to one embodiment.

The user experience analytics model training module 521 uses the data bias manager 355 to unbias the existing software system data 522 prior to training a new model, according to one embodiment. In another embodiment, the user experience analytics training model module 521 uses the data bias manager 355 to unbias the estimated performance metrics of a new user experience analytics model, after defining the new user experience analytics model based on the existing software system data 522, which is biased. The data bias manager 355 applies bias weights 356 to the existing software system data 522 or to one or more business metrics of the new user experience analytics model to improve the accuracy of estimating performance of the new user experience analytics model, according to one embodiment.

The software system 511 adapts to user responses 517 received from users, to update the user experience analytics model 519, and to dynamically and adaptively improve the personalized user experiences 518, according to one embodiment. The software system 511 is configured to store/update user characteristics data 516 and user responses 517, as the existing software system data 522, during the operation of the software system 511. After a predetermined period of time, such as, but not limited to, an hour, a day, semi-weekly, weekly, biweekly, and the like, the user experience analytics model training module 521 retrieves the user experience options 513, the user characteristics data 516, the user responses 517, and the business metrics 525 to determine the performance of the user experience options 513 and to update the user experience analytics model 519, based on the performance of the user experience options 513, according to one embodiment. Particular embodiments for initializing and/or updating the user experience analytics model 519 are disclosed below in the processes 600, 800, 900, 1000, and 1100, and in the corresponding FIGS. 6, 8, 9, 10, and 11, respectively, according to one embodiment.

The business metrics 525 include, but are not limited to, the various metrics used by the software system 511 and/or the service provider of the software system 511 to evaluate the success, failures and/or the performance of the user experience options 513, according to one embodiment. The business metrics 525 include, but are not limited to, number of conversions of users from potential customers to paying customers, the percentage of conversions of potential customers to paying users, quantities of revenue, rates of revenue collected per user (e.g., average revenue collected per user), increases/decreases in revenue as compared to one or more previous years, months, weeks, days, and metric weights that are applied to conversions and revenues to establish a relative importance of conversions verses revenue generation. The business metrics 525 can also include records of other actions taken by users, such as, but not limited to, numbers of questions answered, duration of use of the software system 511, number of pages or user experience displays visited within a software system 511, use of customer support, and the like, according to one embodiment. In one embodiment, the business metrics 525 are stored with the user characteristics data 516 and the user responses 517 in the existing software system data 522.

The software system 511 includes memory 526 that has one or more sections 527 allocated for the operation or support of the software system 511, according to one embodiment. For example, the memory 526 and/or the one or more sections 527 are allocated to the storing and/or processing of: user characteristics data 516, user responses 517, the user experience analytics model 519, the user experience analytics model training module 521, and the like, according to one embodiment. The software system 511 also includes one or more processors 528 configured to execute and/or support the operations of the software system 511, according to one embodiment.

In one embodiment, the decision engine 514 is integrated into the software system 511 to support operation of the software system 511. In one embodiment, the decision engine 514 is hosted in the service provider computing environment 510 and is allocated computing resources, e.g., memory 529 having sections 530, and one or more processors 531, that are different than some of the computing resources of the software system 511. The decision engine 514 is hosted in the service provider computing environment 510 in order to provide support for the software system 511, in addition to providing support for a second service provider software system 532 and/or a third service provider software system 533, according to one embodiment. Although a second service provider software system 532 and a third service provider software system 533 are illustrated and described herein, the decision engine 514 can be configured to operationally support fewer or more software systems, according to various embodiments.

The user experience analytics model training module 521 initializes and/or updates the user experience analytics model 519 from a backend or off-line system, rather than as an integrated online process, according to one embodiment. For example, rather than sharing memory and processor resources with the software system 511, the user experience analytics model training module 521 is allocated dedicated memory and processor resources to facilitate secure and more timely processing of user characteristics of new and existing software system data, and of user experience options for training the user experience analytics model 519. In another embodiment, the user experience analytics model training module 521 is integrated into the software system 511, as illustrated, and shares one or more hardware resources with the decision engine 514, within the service provider computing environment 510, according to one embodiment.

Figure 6:
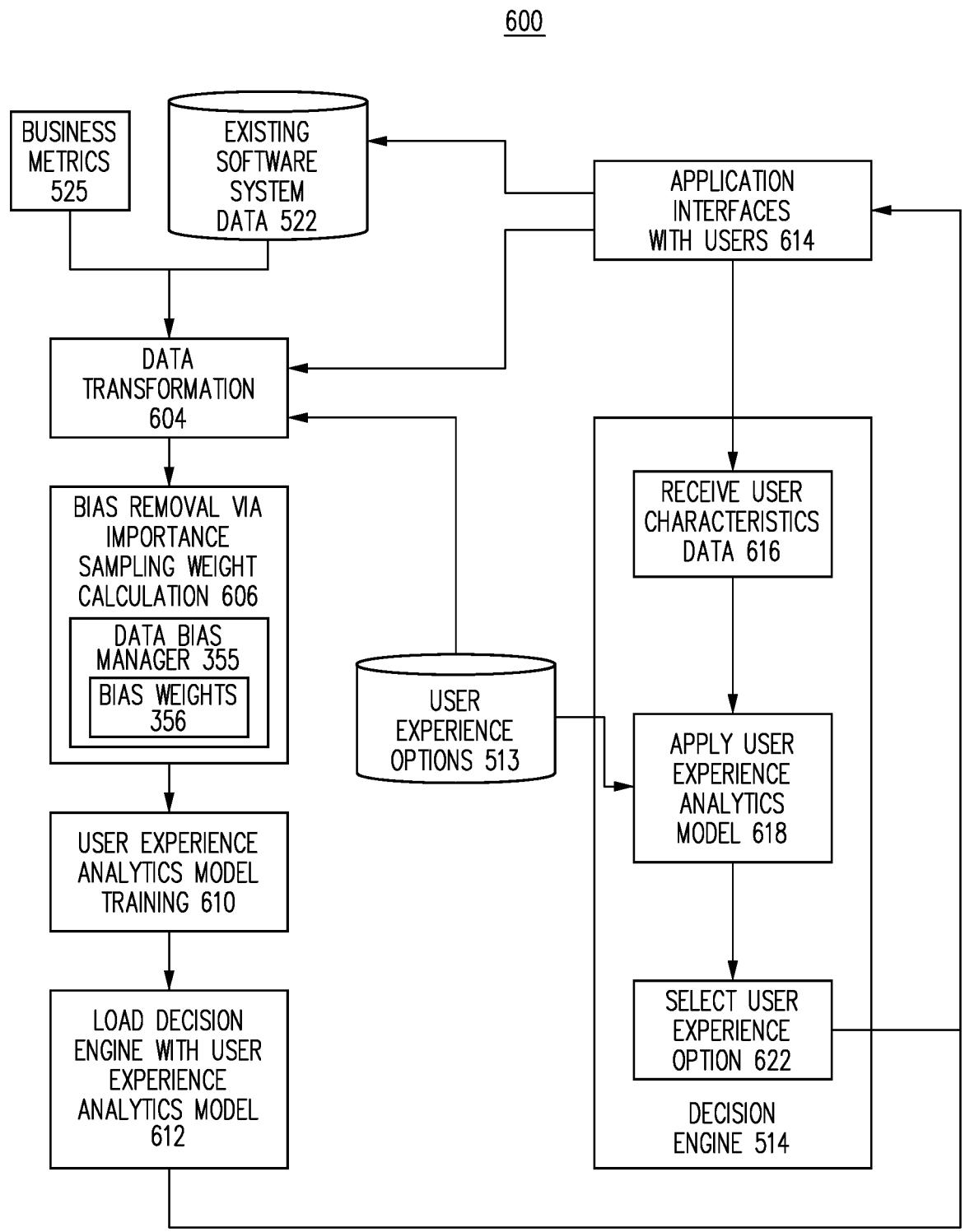
FIG. 6 is a flow diagram of an example of a process for training and updating a user experience analytics model, according to one embodiment.

FIG. 6 illustrates a process 600 for training (e.g., initializing and updating) the user experience analytics model 519 (shown in FIG. 5), according to one embodiment.

Figure 7:
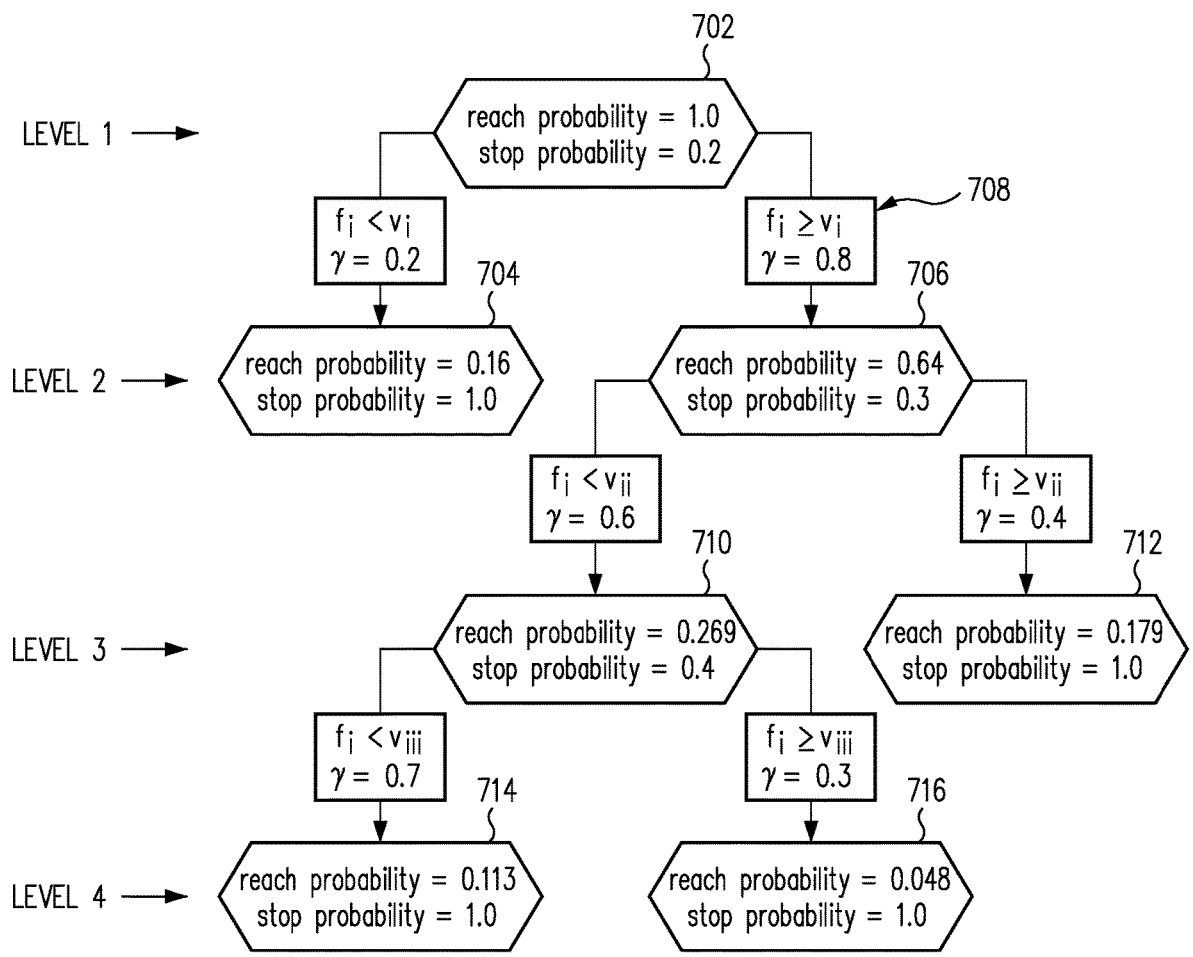
FIG. 7 is diagram of an example of a tree diagram for defining at least part of a user experience analytics model, according to one embodiment.

At operation 604, the process performs data transformation, to prepare existing software system data 522 and data representing business metrics 525 for processing, according to one embodiment. The process performs data transformation on the existing software system data 522 (inclusive of user characteristics data and user responses), on user experience options 513, and on business metrics 525. Data transformation includes, but is not limited to, formatting, rearranging, organizing, ranking, and/or prioritizing the data to enable it to be uniformly processed or analyzed by one or more equations and/or algorithms, according to one embodiment. Operation 604 proceeds to operation 606, according to one embodiment At operation 606, the process performs bias removal via importance sampling weight calculation, according to one embodiment. The process performs bias removal on the business metrics, such as conversions and revenue, as well as on user responses for the existing software system data 522 to account for particular user characteristics that were targeted, that are different, or that otherwise bias the user responses and/or the business metrics, according to one embodiment. In one embodiment, the process executes the data bias manager 355 to apply bias weights 356 to unbias one or more business metrics or other metrics associated with biased data samples. Operation 606 proceeds to operation 610, according to one embodiment At operation 610, the process performs user experience model training, according to one embodiment. The process uses the same algorithm to initialize and to update the user experience analytics model, according to one embodiment. The process trains the user experience analytics model by using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. Operation 610 proceeds to operation 612, according to one embodiment In one embodiment, the process 600 performs user experience model training by creating, validating, and/or modifying a decision tree. FIG. 7 illustrates an example of a decision tree 700 that can be used to determine at least part of the algorithm, logic, and/or function of the user experience analytics model that selects which user experience options to deliver to users based on user characteristics, to facilitate providing personalized user experiences in the software system 511. The decision tree 700 includes nodes 702, 704, 706, 710, 712, 714, and 716 (collectively, nodes 702-716) connected together through edges and edge logic. The edge logic defines the rules and parameters for traversing from a parent node to a child node in the decision tree 700, according to one embodiment. Each of the nodes 702-716 includes node properties, such as a reach probability, a stop probability, a user experience option, and a user segment.

The reach probability is the probability that a person coming into the stream of the decision tree will reach a particular node, according to one embodiment. Because all users are evaluated by the node 702, the reach probability of the node 702 is 1, indicating that there is a 100% chance that a user's characteristics will be evaluated by the node 702. Node 704 has a reach probability of 0.16 and node 706 has a reach probability of 0.64. Accordingly, of all the user traffic that is applied to the decision tree 700, node 704 will receive 16% of the user traffic and node 706 will receive 64% of the user traffic, on average, according to one embodiment. Because each node is assigned at least one user experience option, and because the reach probabilities of the nodes 702-716 indicate the frequency with which a user experience option is provided to users of a user segment, the reach probabilities are the distribution frequency rates described in the production environment 500 (shown in FIG. 5). In other words, the reach probabilities determine a frequency rate by which to distribute user experience options to users of user segments, based on the users' characteristics, according to one embodiment.

The stop probability is the probability that the performance of a particular node without children nodes (for a user segment) will be better than the performance of children nodes split from the particular node, according to one embodiment. In other words, the stop probability is the probability that the performance of a leaf node is greater than the performance of creating two children nodes from a leaf node to convert the leaf node to a parent node. If a stop probability is 1, then the probability of stopping the further evaluation of the data sample is 100%. If a stop probability is less than 1, then the stop probability represents a likelihood that the decision tree will apply the user experience option of the current node rather than evaluating a further path through the nodes of the decision tree 700, according to one embodiment. In one embodiment, if a data sample does not receive the user experience option of a parent node, then the data sample receives the user experience option of a descendent node.

At least one user experience option is assigned to each node of the decision tree 700. In one embodiment, a user experience option is defined as omitting a user experience element (e.g., a button, a text box, a question, a webpage, etc.) from a user's personalized user experience. In one embodiment, a user experience option is defined as adding a user experience element or applying an analytics model, a sequence, or other user experience tool to a user's personalized user experience. In one embodiment, the user experience analytics model includes a different decision tree for each user experience option, so that each of the nodes in the decision tree represent a binary decision to apply or to not apply a user experience option to the user's personalized user experience. In one embodiment, the user experience analytics model includes a different decision tree for each user characteristic, and each of the nodes in the decision tree represent the application of one of a number of user experience options to a user's personalized user experience. In one embodiment, the user experience analytics model includes a decision tree having edge logic that evaluates different user characteristics and each node of the decision tree represent the application of one of a number of user experience options, and the node paths can include a variety user experience options (rather than a Boolean application of a single user experience option).

The user segment is a segment or portion of users who have at least one user characteristic in common. For example, a user set can be bifurcated into two user segments, in which a first user segment includes users who are younger than 30 years old and the second user segment includes users who are at least 30 years old, according to one embodiment.

Each of the nodes 702-716 belong to a level that is defined by 1 plus the number of connections between the node of interest and the root node. Because the root node is the top node in the decision tree 700, the root node for the decision tree 700 is the node 702. Accordingly, node 702 belongs to level 1, nodes 704 and 706 belong to level 2, nodes 710 and 712 belong to level 3, and nodes 714 and 716 belong to level 4 of the decision tree 700, according to one embodiment.

In one embodiment, the user experience option for a node is related to the level of the node in the decision tree 700. In one embodiment, all levels of one decision tree provide binary options for whether or not to apply a single user experience option to a user's personalized user experience. In one embodiment, each level of the decision tree is associated with a different user experience option, and each level of the decision tree provides binary options for whether or not to apply the user experience option associated with that level to a user's personalized user experience. In one embodiment, user experience options are allocated to nodes within the decision tree, based on the dominance or capacity of the user experience option to affect the actions of users, with more dominant user experience options being assigned to nodes that are closer to the root node.

In one embodiment, edge logic includes an edge frequency ($\gamma$) for which a single user characteristic ($f_i$) satisfies a threshold ($v_i$). The edge logic provides rules and the average frequency by which data samples traverse parent nodes to children nodes. The edge logic 708 indicates that the probability of the user characteristic ($f_i$) being greater than or equal to the threshold ($v_i$) is 0.8, and that the probability of the user characteristic ($f_i$) being less than the threshold ($v_i$) is 0.2, according to one embodiment. The reach probability of a child node is the product of the edge frequency ($\gamma$) multiplied with the stop probability subtracted from one. For example, the reach probability of node 706 is 0.64 which is equal to (1−stop probability of node 702)* ($\gamma$=0.8). In one embodiment, the thresholds for descendent nodes are different than all ancestor nodes because each descendent node already satisfies or inherits all of the characteristics of the descendent node's ancestor nodes.

Returning to the process 600 of FIG. 6, at operation 612, the process loads the decision engine with the user experience analytics model, according to one embodiment. Operation 612 proceeds to operation 614, according to one embodiment.

At operation 614, an application interfaces with users, according to one embodiment. The application interfaces with users by providing the users with questions to acquire user responses and/or to acquire user characteristics, according to one embodiment. The application interfaces with users by collecting clickstream data, IP address information, location of the user, operating system used by the user, user computing device identifiers, and other user characteristics data, according to one embodiment. The application and the decision engine save business metrics, user characteristics data, and/or user responses as existing software system data 522, according to one embodiment. The term "application" is used interchangeably with the term "software system", according to one embodiment. Operation 614 concurrently proceeds to operation 604 to update the user experience analytics model, and proceeds to operation 616 to apply the user experience analytics model to information received from the users, according to one embodiment.

At operation 616, the decision engine 514 receives user characteristics data, according to one embodiment. Operation 616 proceeds to operation 618, according to one embodiment.

At operation 618, the decision engine 514 applies the user experience analytics model to the user characteristics data and to user experience options 513, according to one embodiment. The decision engine 514 applies the user experience analytics model to the user characteristics data and to the user experience options 513 to determine the distribution frequency rates for which a particular user experience option is to be distributed to users having one or more of the user characteristics received during operation 616, according to one embodiment. Operation 618 proceeds to operation 622, according to one embodiment.

At operation 622, the decision engine 514 selects a user experience option, according to one embodiment. The decision engine 514 selects a user experience option based on the distribution frequency rates generated by the user experience analytics model in response to receipt of user characteristics data that describe a user. The decision engine 514 generates a pseudo-random number that is weighted according to the distribution frequency rates generated by the user experience analytics model, according to one embodiment. For example, if the user experience analytics model generates distribution frequency rates of 0.8 for filling a user experience display with a background color of red and 0.2 for filling a user experience display with a background color of blue, then the decision engine 514 generates a binary number which will indicate selecting a blue background color 8 out of 10 times and will indicate selecting a red background color 2 out of 10 times, on average, according to one embodiment. Because computing systems typically generate "random" numbers using algorithms and clocks, a "random" number generated by a computing system is referred to as a "pseudo-random" number.

Figure 8:
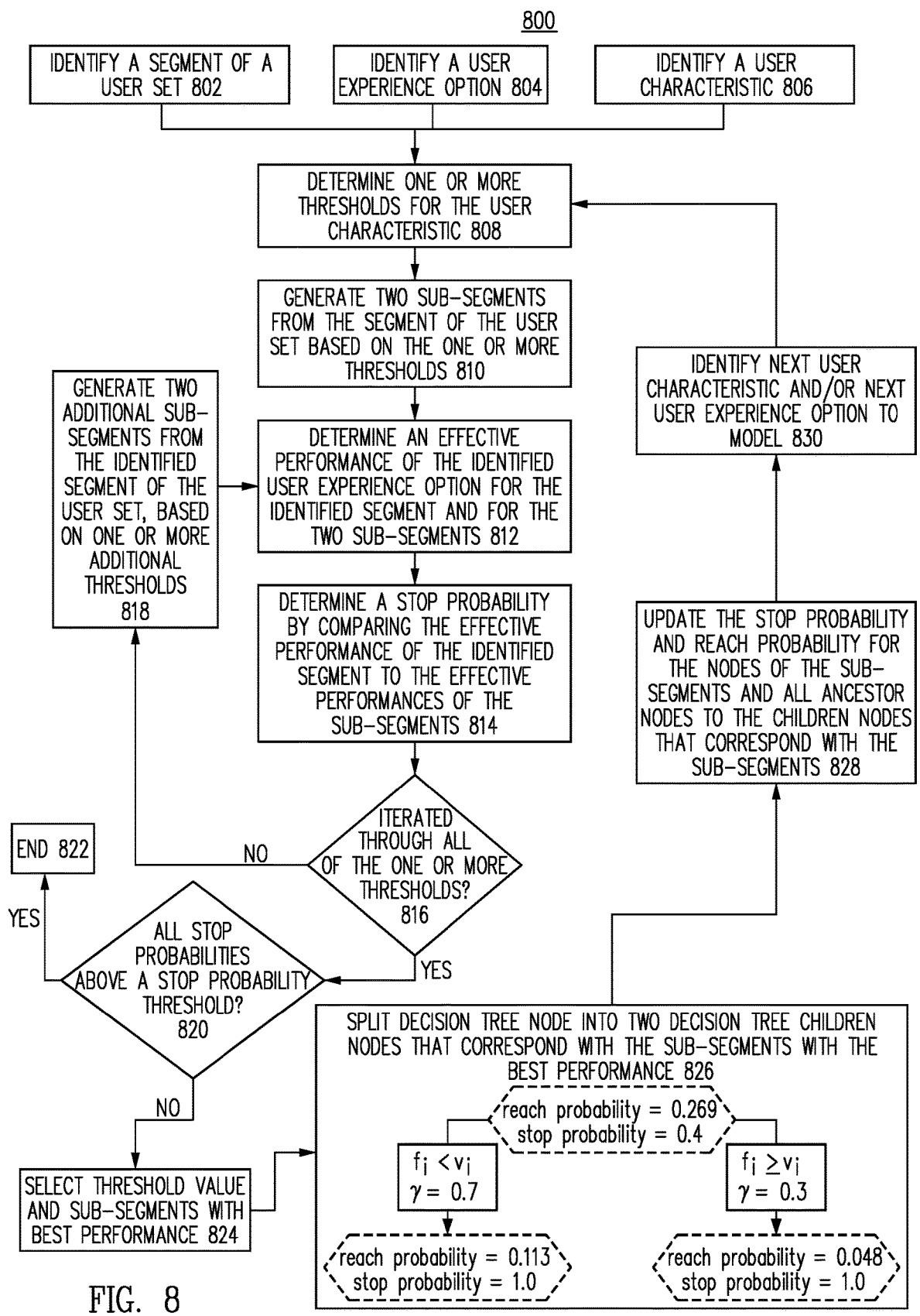
FIG. 8 is a flow diagram of an example of a process for defining a user experience analytics model, in accordance with one embodiment.

FIG. 8 illustrates an example of a process 800 that is employed or executed by the software system 511 of the production environment 500, to periodically update the user experience analytics model 519, according to one embodiment. By periodically updating the user experience analytics model and/or by defining/initializing the user experience analytics model 519, a software system (e.g., a tax return preparation system or other finance management system) can reap the benefits of deploying user experience options that are immediately effective on users (with a probabilistic certainty) while concurrently and adaptively testing user responses to other stimuli, e.g., other user experience options, to improve user satisfaction with the personalized user experience provided by the software system 511, according to one embodiment.

At operation 802 the process identifies a segment of a user set, according to one embodiment. The segment may be the entirety of the user set, may include recent users of the user set, may include users who have interacted with a software system over a predetermined period of time (e.g., during a previous year), or may be any other subset of the user set, according to one embodiment. Operation 802 proceeds to operation 808, according to one embodiment.

At operation 804, the process identifies a user experience option, according to one embodiment. The user experience option identified by the process is used by the process to define nodes, node properties, and edge logic for traversing from parent nodes to children nodes, according to one embodiment. In one embodiment, identifying a user experience option includes identifying a plurality of user experience options, according to one embodiment. In one embodiment, operation 804 occurs prior to operation 802, after operation 802, or concurrently with operation 802, according to one embodiment. Operation 804 proceeds to operation 808, according to one embodiment.

At operation 806, the process identifies a user characteristic, according to one embodiment. As described above, user characteristics can include personal identification information, income information, tax-related information, clickstream information, geographic location of the user, an IP address or other computing or other user computing device identification information, family information about the user, and the like, according to various embodiments. The process performs operation 806 before, in between, after, or concurrently with operation 802 and/or operation 804, according to one embodiment. Operation 806 proceeds to operation 808, according to one embodiment.

At operation 808, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. Operation 808 proceeds to operation 810, according to one embodiment.

At operation 810, the process generates two sub-segments from the segment of the user set, based on the one or more thresholds, according to one embodiment. The operation 810 proceeds to operation 812, according to one embodiment.

At operation 812, the process determines an effective performance of the identified user experience option for the identified segment and for the two sub-segments, according to one embodiment. The effective performance of the user experience option for the identified segment and/or for the two sub-segments is a probabilistic distribution that users (who are defined by the segments and/or sub-segments) will perform one or more predetermined actions, according to one embodiment. Examples of the determined actions include, but are not limited to, answering questions, remaining logged into a user session of the software system, filing a tax return, progressing through a sequence of topics or a sequence of questions, clicking a button, interacting with a particular user experience object or element, paying for a service, submitting credit card information, providing an email address, providing a telephone number, and the like, according to various embodiments. In one embodiment, the process uses Thompson Sampling on user responses to user experience options, at least partially based on user characteristics data, to determine a sample mean and a sample variance for the performance of user experience options on a segment of users, according to one embodiment. In one embodiment, the process uses Thompson Sampling blending or other mathematical techniques for calculating an average of multiple Thompson Samples to determine an effective performance of a user experience option on a segment or sub-segment, according to one embodiment. Operation 812 proceeds to operation 814, according to one embodiment.

At operation 814, the process determines a stop probability by comparing the effective performance of the identified segment to the effective performances of the two sub-segments of the identified segment, according to one embodiment. The stop probability is the probability that the performance of the identified segment is greater than the effective performance of the two sub-segments, according to one embodiment. In terms of nodes in a decision tree, the stop probability is the probability that the effective performance of a user experience option that is associated with a parent node is greater than an effective performance of user experience options that are associated with children nodes, according to one embodiment. A low stop probability indicates that the likelihood of gaining additional effective performance from the user experience analytics model will likely be gained from splitting an identified segment into two sub-segments, according to one embodiment. Operation 814 proceeds to operation 816, according to one embodiment.

At operation 816, the process determines if the process has iterated through all identified thresholds, according to one embodiment. For user characteristics having binary or Boolean outcomes such as yes or no, there may not be multiple thresholds to iterate through. However, if the user characteristics that are used to define part of the model have continuous values, e.g., users' ages, user income, and the like, then the process advantageously identifies and recurses through the multiple thresholds (e.g., through multiple age ranges or income ranges) to test the effective performance of a user experience option against variations of sub-segments, according to one embodiment. If the process completes iterating through all of the one or more thresholds, operation 816 proceeds to operation 820, according to one embodiment. If the process has not iterated through all of the one or more thresholds, operation 816 proceeds to operation 818, according to one embodiment.

At operation 818, the process generates two additional sub-segments from the identified segment of the user set, based on one or more additional thresholds, according to one embodiment. Operation 818 proceeds to operation 812, according to one embodiment.

At operation 820, the process determines if all stop probabilities are above a stop probability threshold, according to one embodiment. If all stop probabilities are above a stop probability threshold, e.g., 0.8, the operation 820 proceeds to operation 822 to end the process, according to one embodiment. If at least one of the stop probabilities is not above the stop probability threshold, operation 820 proceeds to operation 824.

At operation 824, the process selects a threshold value and the sub-segments with the best performance, according to one embodiment. The effective performance of segments and sub-segments is a probabilistic distribution having a sample mean and a sample variance. In one embodiment, the best performance includes a combination of a threshold and a user experience option that results in the highest sample mean. In one embodiment, the best performance includes a combination of a threshold and a user experience option that produces the lowest sample variance. In one embodiment, the best performance includes a combination of a threshold and a user experience option that produces the highest sample mean and/or the lowest sample variance while having a sample mean that is greater than a minimum threshold and/or while having a sample variance that is below a maximum sample variance threshold. Operation 824 proceeds to operation 826, according to one embodiment.

At operation 826, the process splits a decision tree node into two decision tree children nodes that correspond with the sub-segments with the best performance, according to one embodiment. When creating children nodes, the node properties (e.g., the reach probabilities, stop probabilities, user experience options, etc.) are defined for the children nodes and the node properties for the parent node of the split are also updated. Operation 826 proceeds to operation 828, according to one embodiment.

At operation 828, the process updates the stop probability and the reach probability for the nodes of the sub-segments and all ancestor nodes to the children nodes that correspond with the sub-segments, according to one embodiment. For example, because the sum of the reach probabilities for the nodes of the decision tree is 1, the reach probabilities of ancestor nodes are updated to reflect the addition of the children node reach probabilities, according to one embodiment. Operation 828 proceeds to operation 830, according to one embodiment.

At operation 830, the process identifies a next user characteristic and/or a next user experience option to model, according to one embodiment. Operation 830 proceeds to operation 808, according to one embodiment.

Figure 9:
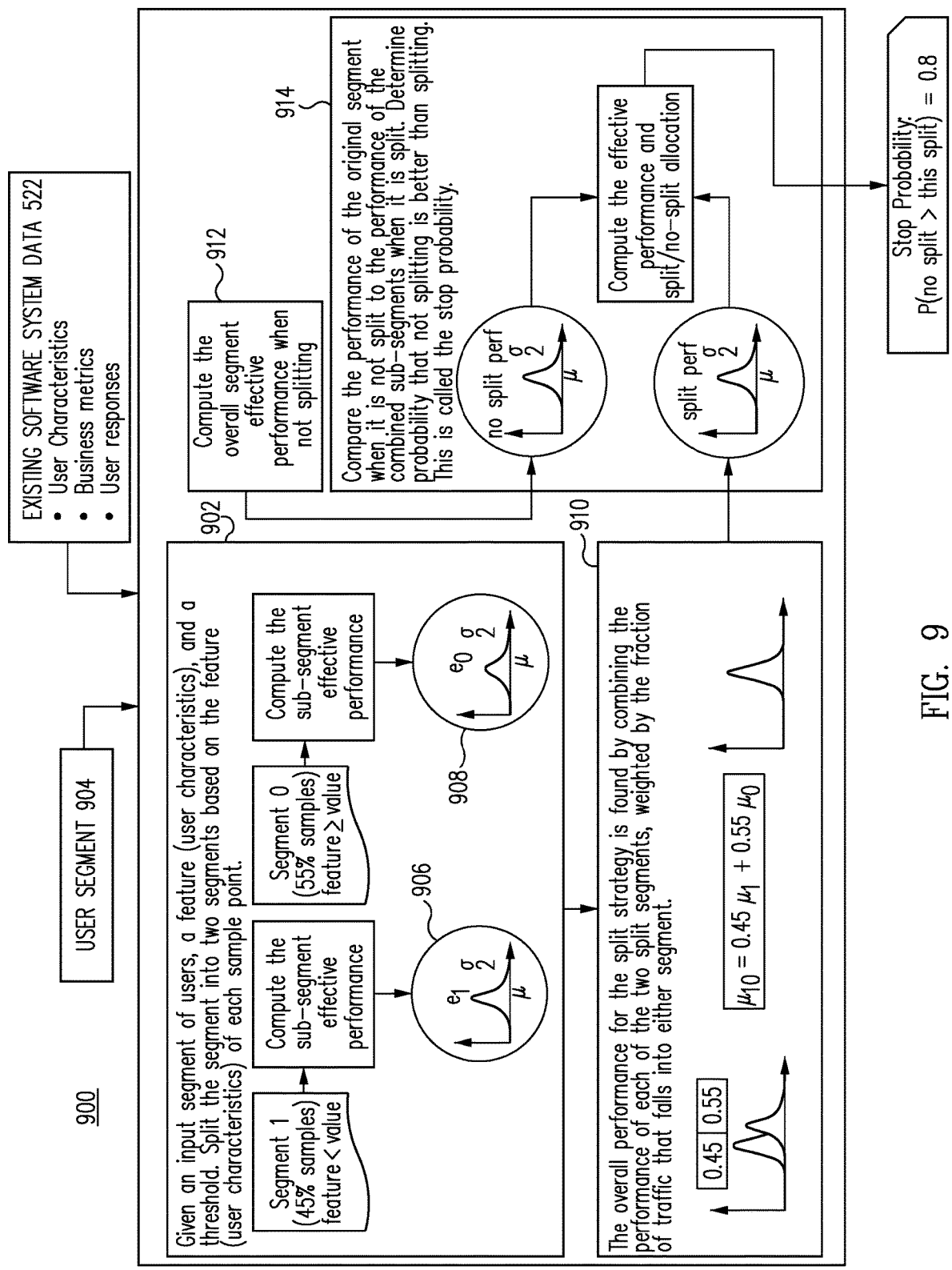
FIG. 9 is a flow diagram of an example of a process for determining a stop probability, in accordance with one embodiment.

FIG. 9 illustrates an example of a flow diagram for a process 900 for determining a stop probability, according to one embodiment. The process 900 is an example of one technique for determining a stop probability that can be performed during operation 814 of FIG. 8 of the process 800 for defining a user experience analytics model, according to one embodiment.

At block 902, the process splits a user segment 904 into two sub-segments, and determines the effective performance of each sub-segment based on existing software system data 522, according to one embodiment. The existing software system data includes, but is not limited to, user characteristics data, user responses, conversion rates of users to paying customers, revenue generated by the software system, and the like, according to one embodiment. The sub-segments are splits based on a value of the threshold and based on whether a user characteristic is less than the value or greater than or equal to the value of the threshold, according to one embodiment. The result of determining the effective performance of each sub-segment is a probabilistic distribution 906 and a probabilistic distribution 908 for the sub-segments, according to one embodiment. The probabilistic distributions 906 and 908 are not just an estimate of the performance of a user experience option on each sub-segment, instead, the probabilistic distributions 906 and 908 are estimations of the probability of the performance of a user experience option on the sub-segments. The effective performances result in probabilistic distributions because the effective performances are estimates of performance that include the uncertainty around how a user will respond to a user experience option integrated into the user's personalized user experience, according to one embodiment. The process proceeds from block 902 to block 910, according to one embodiment.

At block 910, the process determines/computes the combined effective performance of the effective performance of the two sub-segments, according to one embodiment. The process determines the combined effective performance by using addition or other mathematical operations to combine the performance of each sub-segment, with each sub-segment effective performance weighted by the edge frequency (γ) (fraction of parent node traffic from FIG. 7), to remove bias, in one embodiment. The process proceeds from block 910 to block 914, according to one embodiment.

At block 912, the process determines/computes the effective performance of the segment as though the sub-segments were not being split from the segment, according to one embodiment. In other words, the process computes the overall segment effective performance assuming the segment is not being split. The process proceeds from block 912 to block 914, according to one embodiment.

At block 914, the process compares the effective performance of the segment, when it is not split, to the combined effective performance of the sub-sections, to determine the stop probability, according to one embodiment. The stop probability is the probability that the effective performance of the un-split segment is greater or better than the effective performance of splitting the segment, according to one embodiment.

Figure 10:
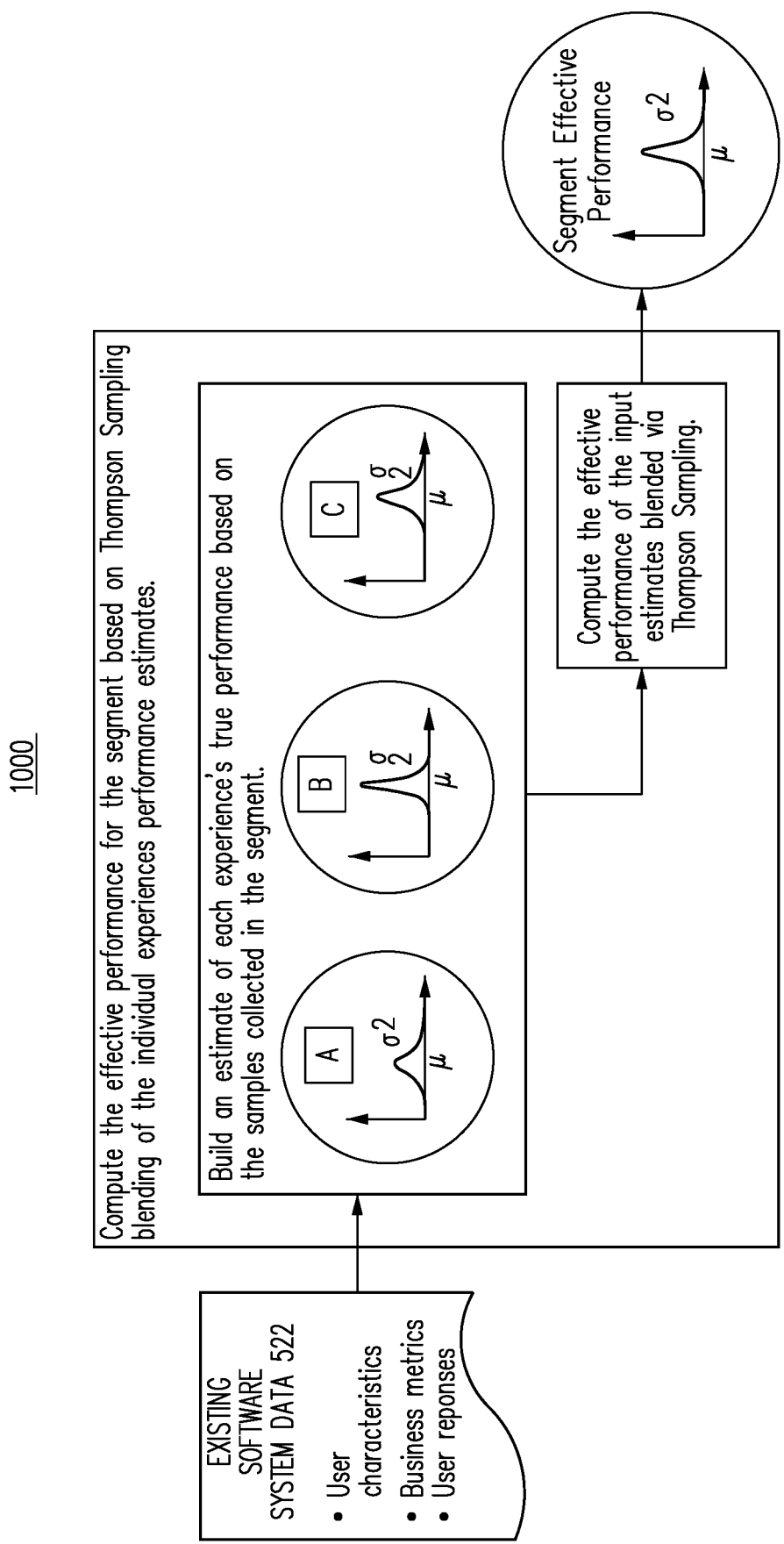
FIG. 10 is a flow diagram of an example of a process for computing the effective performance of a segment or subsegment of users, in accordance with one embodiment.

FIG. 10 illustrates an example of a flow diagram of a process 1000 for computing the effective performance of a segment or sub-segment of users, according to one embodiment. The process 1000 is an example of one technique that can be used by operation 812 (shown in FIG. 8) for the process 800 for defining a user experience analytics model, according to one embodiment. The process 1000 is an example of one technique that can be used in blocks 902 and/or 912 (shown in FIG. 9) for the process 900 for determining a stop probability, according to one embodiment.

The process 1000 uses existing software system data 522 to compute the effective performance for a segment based on Thompson Sampling blending of the performance of individual user experience options and/or based on each individual user's experience/feedback with the software system (e.g., in response to receiving the user experience option in the user's personalized user experience), according to one embodiment.

FIG. 11 illustrates an example flow diagram for a process 1100 for computing the effective performance of input estimates blended by Thompson Sampling, according to one embodiment. The process 1100 is an example of one technique that can be used in block 914 (show in FIG. 9) of the process 900 for determining a stop probability, according to one embodiment. The process 1100 is an example of one technique that can be used during the process 1000 for computing the effective performance of a segment or sub-segment, according to one embodiment.

The process 1100 uses the probability density function ("PDF") and the cumulative distribution function ("CDF") to determine the probability that the true performance of each user's experience or of each user experience option is better than alternative options, according to one embodiment. As illustrated in FIG. 11, the process 1100 computes the effective performance of an entire segment of users as a weighted combination of either each user's experience or of the distribution of a particular user experience option to the users of the segment of users, in one embodiment.

Figure 12A:
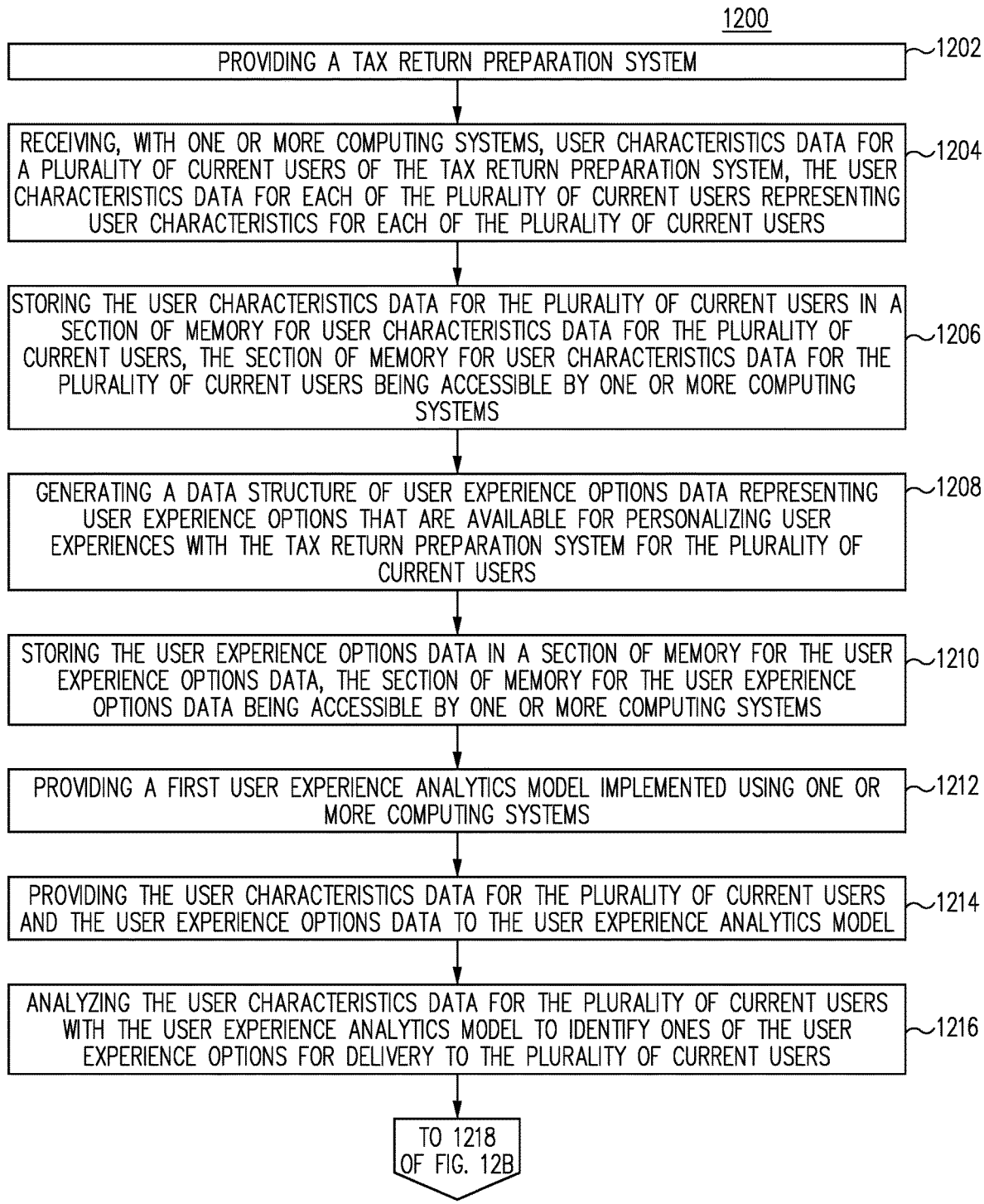
FIGS. 12A and 12B are a flow diagram of an example of a process for generating user experience analytics models by unbiasing data samples to improve personalization of user experiences in a tax return preparation system, according to one embodiment.
Figure 12B:
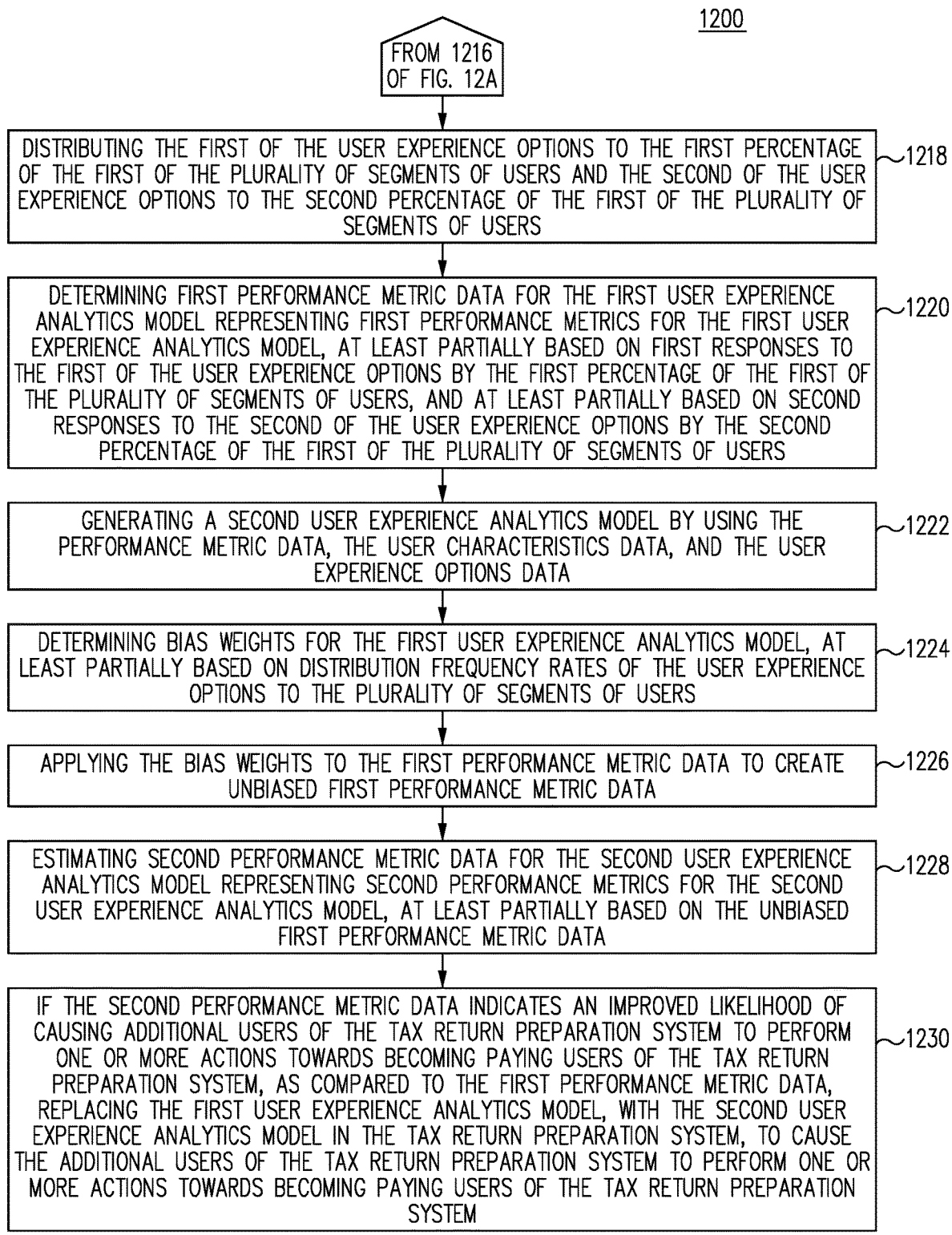

FIG. 12 illustrates an example flow diagram of a process 1200 for generating user experience analytics models by unbiasing data samples to improve personalization of user experiences in a tax return preparation system, according to one embodiment.

At operation 1202, the process includes providing a tax return preparation system, according to one embodiment.

At operation 1204, the process includes receiving, with one or more computing systems, user characteristics data for a plurality of current users of the tax return preparation system, the user characteristics data for each of the plurality of current users representing user characteristics for each of the plurality of current users, according to one embodiment.

At operation 1206, the process includes storing the user characteristics data for the plurality of current users in a section of memory for user characteristics data for the plurality of current users, the section of memory for user characteristics data for the plurality of current users being accessible by one or more computing systems, according to one embodiment.

At operation 1208, the process includes generating a data structure of user experience options data representing user experience options that are available for personalizing user experiences with the tax return preparation system for the plurality of current users, according to one embodiment.

At operation 1210, the process includes storing the user experience options data in a section of memory for the user experience options data, the section of memory for the user experience options data being accessible by one or more computing systems, according to one embodiment.

At operation 1212, the process includes providing a first user experience analytics model implemented using one or more computing systems, according to one embodiment.

At operation 1214, the process includes providing the user characteristics data for the plurality of current users and the user experience options data to the user experience analytics model, according to one embodiment.

At operation 1216, the process includes analyzing the user characteristics data for the plurality of current users with the user experience analytics model to identify ones of the user experience options for delivery to the plurality of current users, according to one embodiment.

Analyzing the user characteristics data for the plurality of current users includes categorizing each of the plurality of current users into one of a plurality of segments of users at least partially based on the user characteristics data for the plurality of current users, according to one embodiment. Analyzing the user characteristics data for the plurality of current users includes, for a first of the plurality of segments of users, identifying a first of the user experience options for delivery to a first percentage of the first of the plurality of segments of users, according to one embodiment. Analyzing the user characteristics data for the plurality of current users includes, for the first of the plurality of segments of users, identifying a second of the user experience options for delivery to a second percentage of the first of the plurality of segments of users, according to one embodiment.

At operation 1218, the process includes distributing the first of the user experience options to the first percentage of the first of the plurality of segments of users and the second of the user experience options to the second percentage of the first of the plurality of segments of users, according to one embodiment.

At operation 1220, the process includes determining first performance metric data for the first user experience analytics model representing first performance metrics for the first user experience analytics model, at least partially based on first responses to the first of the user experience options by the first percentage of the first of the plurality of segments of users, and at least partially based on second responses to the second of the user experience options by the second percentage of the first of the plurality of segments of users, according to one embodiment. In one embodiment, the performance metrics are business metrics, as described above.

At operation 1222, the process includes generating a second user experience analytics model by using the performance metric data, the user characteristics data, and the user experience options data, according to one embodiment.

At operation 1224, the process includes determining bias weights for the first user experience analytics model, at least partially based on distribution frequency rates of the user experience options to the plurality of segments of users, according to one embodiment. In one embodiment, all of the distribution frequency rates for the leaf nodes of a decision tree of a user experience analytics model sum to 1, according to one embodiment.

At operation 1226, the process includes applying the bias weights to the first performance metric data to create unbiased first performance metric data, according to one embodiment. In one embodiment, applying the bias weights includes multiplying one or more performance metrics by the bias weights.

At operation 1228, the process includes estimating second performance metric data for the second user experience analytics model representing second performance metrics for the second user experience analytics model, at least partially based on the unbiased first performance metric data, according to one embodiment.

At operation 1230, the process includes, if the second performance metric data indicates an improved likelihood of causing additional users of the tax return preparation system to perform one or more actions towards becoming paying users of the tax return preparation system, as compared to the first performance metric data, replacing the first user experience analytics model with the second user experience analytics model in the tax return preparation system, to cause the additional users of the tax return preparation system to perform one or more actions towards becoming paying users of the tax return preparation system, according to one embodiment.

By providing personalized user experiences to users of a software system, and by unbiasing data samples that are used for determining users' preferences for user experience options, implementation of embodiments of the present disclosure allows for significant improvement to the fields of user experience, electronic tax return preparation, data analytics, data collection, and data processing, according to one embodiment. As one illustrative example, by unbiasing data samples that are used for determining users' preferences for user experience options, embodiments of the present disclosure allows for progressing a user through software system user flows and/or tax return preparation sessions with fewer processing cycles and less communications bandwidth because the user is more likely to receive preferred content, be satisfied, and be less likely to prematurely terminate his/her user session prior to completing a particular activity (e.g., filing a tax return). This reduces processing cycles and communications bandwidth because a satisfied user does not redundantly use processing cycles and bandwidth to reenter his/her information into competing tax return preparation system and/or software system. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by unbiasing data samples that are used for determining users' preferences for user experience options, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, unbiasing data samples that are used for determining users' preferences for user experience options, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method generates user experience analytics models by unbiasing data samples to improve personalization of user experiences in a tax return preparation system. The process includes providing a tax return preparation system, according to one embodiment. The process includes receiving, with one or more computing systems, user characteristics data for a plurality of current users of the tax return preparation system, the user characteristics data for each of the plurality of current users representing user characteristics for each of the plurality of current users, according to one embodiment. The process includes storing the user characteristics data for the plurality of current users in a section of memory for user characteristics data for the plurality of current users, the section of memory for user characteristics data for the plurality of current users being accessible by one or more computing systems, according to one embodiment. The process includes generating a data structure of user experience options data representing user experience options that are available for personalizing user experiences with the tax return preparation system for the plurality of current users, according to one embodiment. The process includes storing the user experience options data in a section of memory for the user experience options data, the section of memory for the user experience options data being accessible by one or more computing systems, according to one embodiment. The process includes providing a first user experience analytics model implemented using one or more computing systems, according to one embodiment. The process includes providing the user characteristics data for the plurality of current users and the user experience options data to the user experience analytics model, according to one embodiment. The process includes analyzing the user characteristics data for the plurality of current users with the user experience analytics model to identify ones of the user experience options for delivery to the plurality of current users, according to one embodiment. Analyzing the user characteristics data for the plurality of current users includes categorizing each of the plurality of current users into one of a plurality of segments of users at least partially based on the user characteristics data for the plurality of current users, according to one embodiment. Analyzing the user characteristics data for the plurality of current users includes, for a first of the plurality of segments of users, identifying a first of the user experience options for delivery to a first percentage of the first of the plurality of segments of users, according to one embodiment. Analyzing the user characteristics data for the plurality of current users includes, for the first of the plurality of segments of users, identifying a second of the user experience options for delivery to a second percentage of the first of the plurality of segments of users, according to one embodiment. The process includes distributing the first of the user experience options to the first percentage of the first of the plurality of segments of users and the second of the user experience options to the second percentage of the first of the plurality of segments of users, according to one embodiment. The process includes determining first performance metric data for the first user experience analytics model representing first performance metrics for the first user experience analytics model, at least partially based on first responses to the first of the user experience options by the first percentage of the first of the plurality of segments of users, and at least partially based on second responses to the second of the user experience options by the second percentage of the first of the plurality of segments of users, according to one embodiment. The process includes generating a second user experience analytics model by using the performance metric data, the user characteristics data, and the user experience options data, according to one embodiment. The process includes determining bias weights for the first user experience analytics model, at least partially based on distribution frequency rates of the user experience options to the plurality of segments of users, according to one embodiment. The process includes applying the bias weights to the first performance metric data to create unbiased first performance metric data, according to one embodiment. The process includes estimating second performance metric data for the second user experience analytics model representing second performance metrics for the second user experience analytics model, at least partially based on the unbiased first performance metric data, according to one embodiment. The process includes, if the second performance metric data indicates an improved likelihood of causing additional users of the tax return preparation system to perform one or more actions towards becoming paying users of the tax return preparation system, as compared to the first performance metric data, replacing the first user experience analytics model with the second user experience analytics model in the tax return preparation system, to causing the additional users of the tax return preparation system to perform one or more actions towards becoming paying users of the tax return preparation system, according to one embodiment.

In accordance with an embodiment, a computer system implemented method generates user experience analytics models by unbiasing data samples to improve personalization of user experiences in a tax return preparation system.

The method includes providing a tax return preparation system, according to one embodiment. The method includes receiving, with one or more computing systems, user characteristics data for a plurality of current users of the tax return preparation system, the user characteristics data for each of the plurality of current users representing user characteristics for each of the plurality of current users, according to one embodiment. The method includes storing the user characteristics data for the plurality of current users in a section of memory for user characteristics data for the plurality of current users, the section of memory for user characteristics data for the plurality of current users being accessible by one or more computing systems, according to one embodiment. The method includes generating a data structure of user experience options data representing user experience options that are available for personalizing user experiences with the tax return preparation system for the plurality of current users, according to one embodiment. The method includes storing the user experience options data in a section of memory for the user experience options data, the section of memory for the user experience options data being accessible by one or more computing systems, according to one embodiment. The method includes providing a first user experience analytics model implemented using one or more computing systems, according to one embodiment. The method includes providing the user characteristics data for the plurality of current users and the user experience options data to the user experience analytics model, according to one embodiment. The method includes analyzing the user characteristics data for the plurality of current users with the user experience analytics model to identify ones of the user experience options for delivery to the plurality of current users, according to one embodiment. Analyzing the user characteristics data for the plurality of current users includes categorizing each of the plurality of current users into one of a plurality of segments of users at least partially based on the user characteristics data for the plurality of current users, according to one embodiment. Analyzing the user characteristics data for the plurality of current users includes, for a first of the plurality of segments of users, identifying a first of the user experience options for delivery to a first percentage of the first of the plurality of segments of users, according to one embodiment. Analyzing the user characteristics data for the plurality of current users includes, for the first of the plurality of segments of users, identifying a second of the user experience options for delivery to a second percentage of the first of the plurality of segments of users, according to one embodiment. The method includes distributing the first of the user experience options to the first percentage of the first of the plurality of segments of users and the second of the user experience options to the second percentage of the first of the plurality of segments of users, according to one embodiment. The method includes receiving first responses to the first of the user experience options by the first percentage of the first of the plurality of segments of users, and second responses to the second of the user experience options by the second percentage of the first of the plurality of segments of users, according to one embodiment. The method includes determining bias weights for the first user experience analytics model, at least partially based on distribution frequency rates of the user experience options to the plurality of segments of users, according to one embodiment. The method includes applying the bias weights to data samples to create unbiased data samples, the unbiased data samples including user characteristics data for the plurality of current users, identifiers of user experience options received by the plurality of current users, first responses to the first of the user experience options by the first percentage of the first of the plurality of segments of users, and second responses to the second of the user experience options by the second percentage of the first of the plurality of segments of users, according to one embodiment. The method includes generating a second user experience analytics model from the unbiased data samples, according to one embodiment. The method includes replacing the first user experience analytics model with the second user experience analytics model in the tax return preparation system to improve a likelihood of causing additional users of the tax return preparation system to perform one or more actions towards becoming paying users of the tax return preparation system.

In accordance with an embodiment, a system generates a user experience analytics model to provide personalized user experiences. The system includes a memory that stores user characteristics data of current users of a tax return preparation system, according to one embodiment. The system includes one or more processors communicatively coupled to the memory to perform operations on the user characteristics of the current users of the tax return preparation system, according to one embodiment. The system includes a system engine that receives, with one or more processors, the user characteristics data of the current users and user responses data of the current users, the user characteristics data of the current users representing user characteristics of the users, the user responses data representing user responses of the current users, wherein the system engine stores the user characteristics data of the current users and the user responses data of the current users in the memory, according to one embodiment. The system includes a decision engine that receives, with the one or more processors, the user characteristics data of the current users from the memory and applies the user characteristics data of the current users to a first user experience analytics model to identify a first percentage of a segment of the current users to which to provide first user experience option data and to identify a second percentage of the segment of the current users to which to provide second user experience option data, the first user experience option data representing a first of a plurality of user experience options, the second user experience option data representing a second of a plurality of user experience options, according to one embodiment. The system engine delivers the first user experience option data to the first percentage of a segment of the current users and the second user experience option data to the second percentage of the segment of the current users, according to one embodiment. The system engine receives first responses to the first user experience option data to the first percentage of a segment of the current users, from the first percentage of a segment of the current users, according to one embodiment. The system engine receives second responses to the second user experience option data to the second percentage of a segment of the current users, from the second percentage of a segment of the current users, according to one embodiment. The system includes a data bias manager that, determining bias weights for the first user experience analytics model, at least partially based on distribution frequency rates for the first and second user experience option data to the first and second percentage of a segment of the current users, according to one embodiment. The data bias manager applies the bias weights to data samples to create unbiased data samples, the data samples including user characteristics data of the current users, identifiers of user experience options received by the current users, the first responses, and the second responses, according to one embodiment. The system includes an analytics model training module that generates a second user experience analytics model using the unbiased data samples, according to one embodiment. The decision engine is configured apply additional user characteristics data for additional current users to the second user experience analytics model, to increase a likelihood that the additional current users perform one or more actions towards becoming a revenue-generating user of the tax return preparation for a service provider that provides the tax return preparation system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method of generating an improved user experience analytics model, the method performed by one or more processors of a system and comprising:
receiving data related to characteristics of a set of system users;
storing the data related to the characteristics of the set of system users;
generating user experience options representing options available for personalizing user experiences;
storing the user experience options in system memory;
providing a first user experience analytics model;
providing the data related to the characteristics of the set of system users to the first user experience analytics model; and
using the first user experience analytics model to identify a first set of the user experience options to distribute to the set of system users by:
categorizing the set of system users into a first segment of users and a second segment of users;
identifying a first one of the user experience options to distribute at a first distribution rate to the first segment of users;
identifying a second one of the user experience options to distribute at a second distribution rate to the second segment of users;
distributing the first one of the user experience options at the first distribution rate to the first segment of users concurrently with distributing the second one of the user experience options at the second distribution rate to the second segment of users;
receiving first responses to the first one of the user experience options from the first segment of users and receiving second responses to the second one of the user experience options from the second segment of users;
determining bias weights associated with the first user experience analytics model based on the first and the second distribution rates;
applying the bias weights to create unbiased data samples indicating user characteristics for the set of system users based on the stored data related to the characteristics of the set of system users and the first responses to the first one of the user experience options;
determining a likelihood that users will pay for access to the system when distributed the first user experience analytics model based on the applying of the bias weights;
generating a second user experience analytics model based on the unbiased data samples, the stored data related to the characteristics of the set of system users, the second user experience analytics model having a likelihood greater than the likelihood of the first user experience analytics model;
replacing the first user experience analytics model with the second user experience analytics model; and
dynamically providing the second user experience analytics model to the set of system users.

2. The method of claim 1, wherein each of the bias weights is inversely proportional to at least one distribution rate for each leaf node of a decision tree.

3. The method of claim 1, wherein the user experience options relate to at least one of a user interface element or a predictive model.

4. A system for generating an improved user experience analytics model, the system comprising:
one or more processors; and
a memory coupled to the one or more processors and storing instructions that, when executed by the one or more processors, causes the system to perform operations including:
receiving data related to characteristics of a set of system users;
storing the data related to the characteristics of the set of system users;
generating user experience options representing options available for personalizing user experiences;
storing the user experience options in system memory;
providing a first user experience analytics model;
providing the data related to the characteristics of the set of system users to the first user experience analytics model; and
using the first user experience analytics model to identify a first set of the user experience options to distribute to the set of system users by:
categorizing the set of system users into a first segment of users and a second segment of users;
identifying a first one of the user experience options to distribute at a first distribution rate to the first segment of users;
identifying a second one of the user experience options to distribute at a second distribution rate to the second segment of users;
distributing the first one of the user experience options at the first distribution rate to the first segment of users concurrently with distributing the second one of the user experience options at the second distribution rate to the second segment of users;
receiving first responses to the first one of the user experience options from the first segment of users and receiving second responses to the second one of the user experience options from the second segment of users;
determining bias weights associated with the first user experience analytics model based on the first and the second distribution rates;
applying the bias weights to create unbiased data samples indicating user characteristics for the set of system users based on the stored data related to the characteristics of the set of system users and the first responses to the first one of the user experience options;
determining a likelihood that users will pay for access to the system when distributed the first user experience analytics model based on the applying of the bias weights;
generating a second user experience analytics model based on the unbiased data samples, the stored data related to the characteristics of the set of system users, the second user experience analytics model having a likelihood greater than the likelihood of the first user experience analytics model;
replacing the first user experience analytics model with the second user experience analytics model; and
dynamically providing the second user experience analytics model to the set of system users.

5. The system of claim 4, wherein each of the bias weights is inversely proportional to at least one distribution rate for each leaf node of a decision tree.

6. The system of claim 4, wherein the user experience options relate to at least one of a user interface element or a predictive model.

* * * * *